United States Patent [19]

Hibino et al.

[11] Patent Number: 4,853,773

[45] Date of Patent: Aug. 1, 1989

[54] ENDOSCOPE SIGNAL PROCESSING APPARATUS USING SEQUENTIAL AND SYNCHRONOUS IMAGING DEVICES

[75] Inventors: Hiroki Hibino, Hachioji; Kenji Kimura, Tachikawa; Teruo Eino, Hachioji, all of Japan

[73] Assignee: Olympus Optical, Co., Ltd., Tokyo, Japan

[21] Appl. No.: 150,259

[22] Filed: Jan. 29, 1988

[30] Foreign Application Priority Data

Jan. 31, 1987 [JP] Japan ................................. 62-21460
Feb. 17, 1987 [JP] Japan ................................. 62-34029
Feb. 17, 1987 [JP] Japan ................................. 62-34027
Mar. 17, 1987 [JP] Japan ................................. 62-61683

[51] Int. Cl.$^4$ .............................................. H04N 7/18
[52] U.S. Cl. ......................................... 358/98; 128/6; 128/303.15; 358/901
[58] Field of Search ................... 358/98, 901; 128/4, 128/6, 303.15; 350/96.26, 96.27; 250/227

[56] References Cited

U.S. PATENT DOCUMENTS 4,562,831 1/1986 Murakoski et al. .................. 358/98
4,602,281 7/1986 Nagasaki et al. .................... 358/98
4,631,582 12/1986 Nagasaki et al. .................... 358/98
4,653,478 3/1987 Nagasaki et al. ...................... 128/6
4,713,683 12/1987 Fujimori et al. ..................... 358/98
4,759,347 7/1988 Ando ................................... 358/98

Primary Examiner—Howard K. Britton
Assistant Examiner—John K. Peng
Attorney, Agent, or Firm—Armstrong, Nikaido Marmelstein Kubovcik & Murray

[57] ABSTRACT

The endoscope signal processing apparatus is provided with a first signal processing device processing the signal for a field sequential type imaging device and a second signal processing device processing the signal for a synchronous type imaging device. One signal processing device has a circuit partly used in common with the other signal processing device. Both signal processing device have a common video signal output end from which video signals from both signal processing devices are output. This apparatus is further provided with a discriminating device discriminating the imaging system of the endoscope to be connected and an output switching device whereby the video signal transmitted through the video signal processing device corresponding to the imaging system discriminated by this discriminating device is led selectively to the common video signal output.

54 Claims, 34 Drawing Sheets

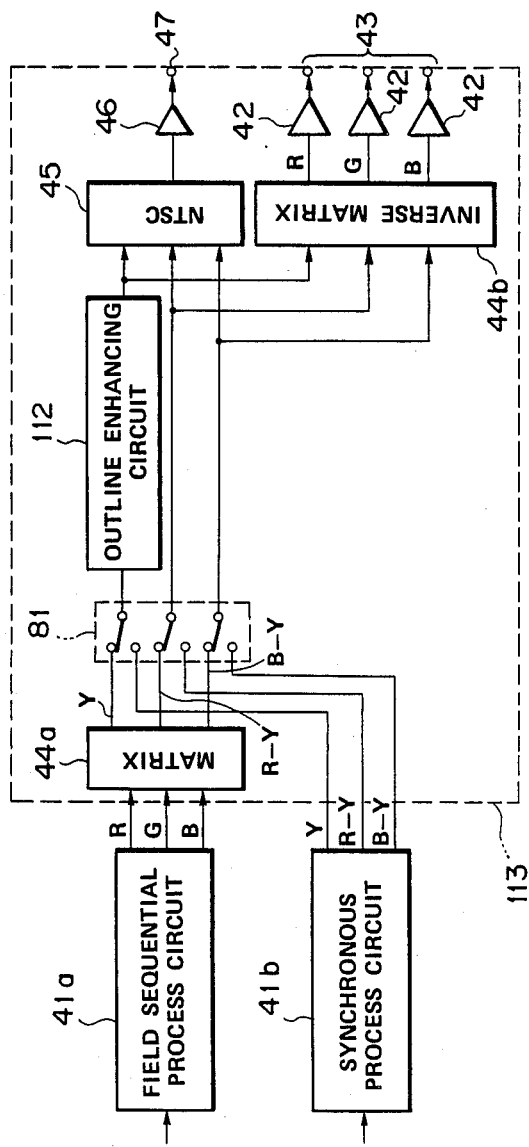

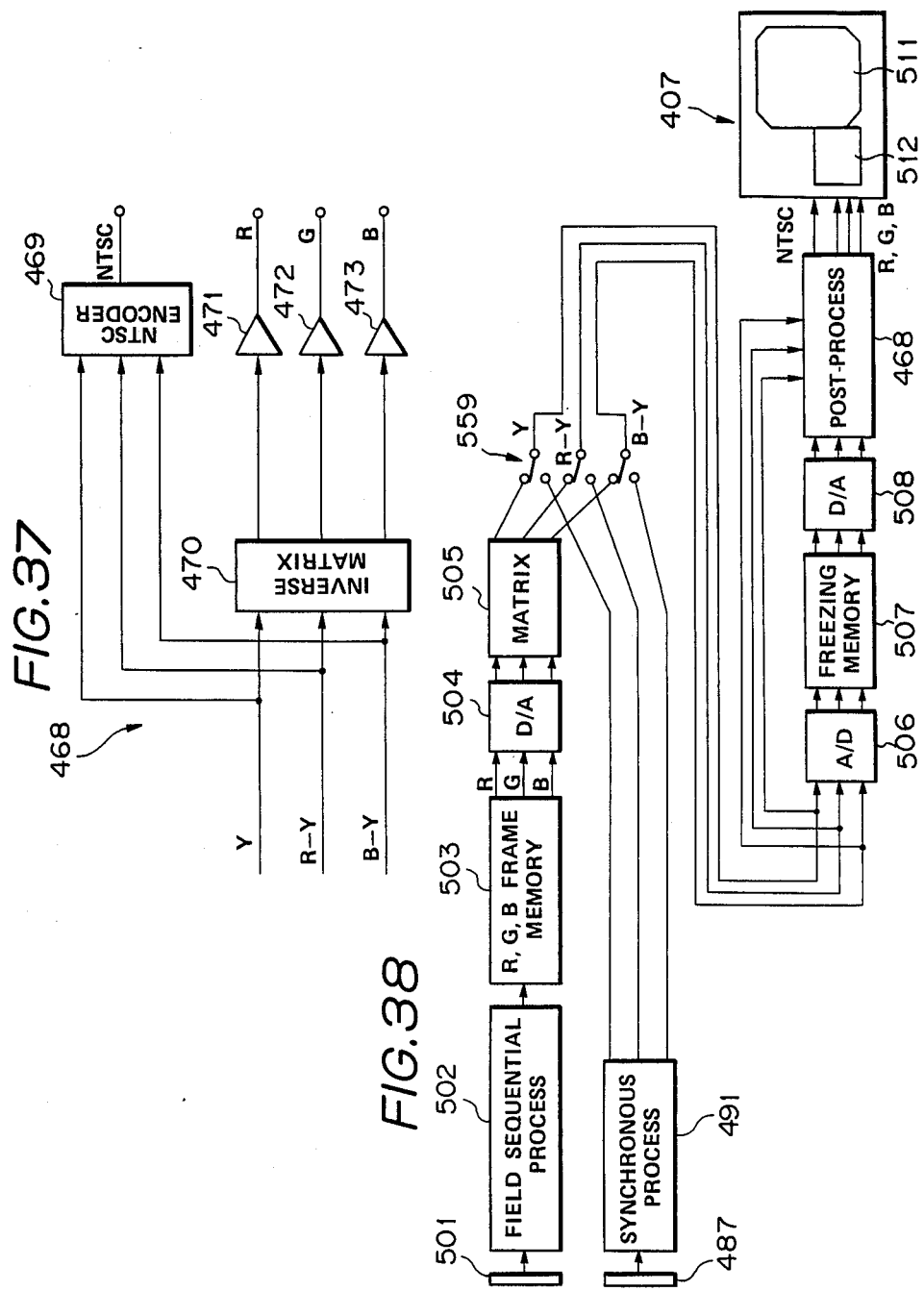

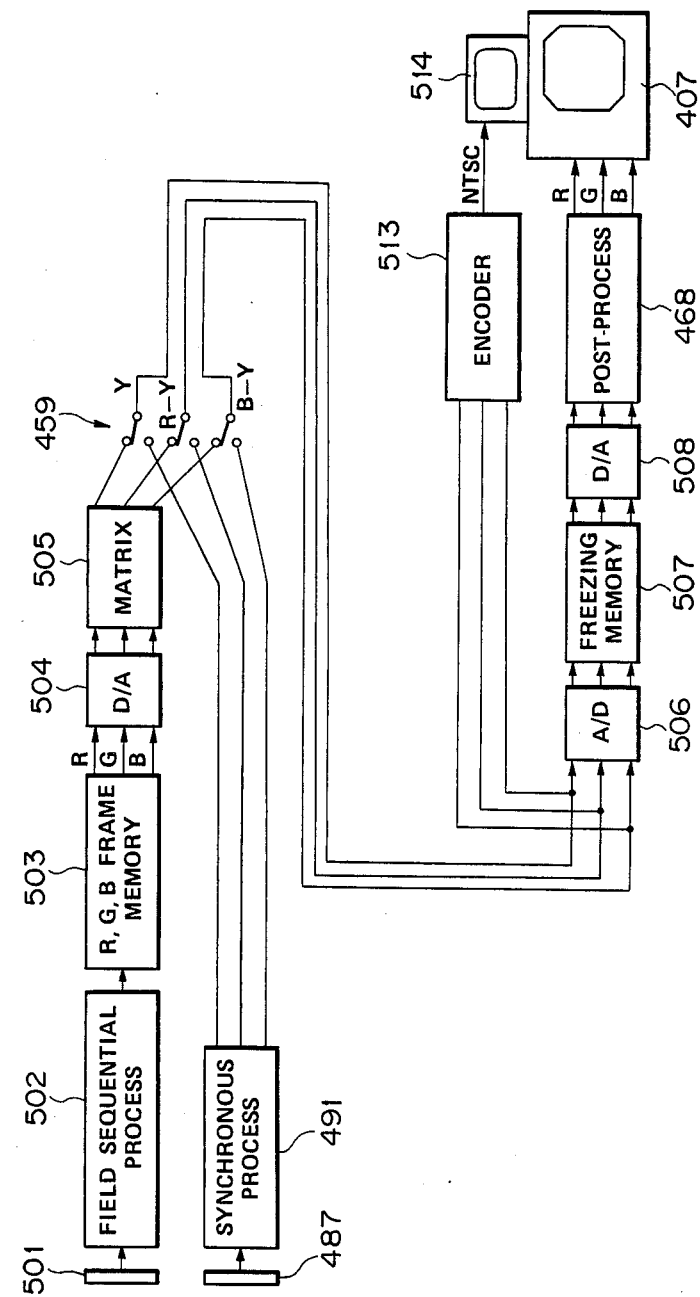

ENDOSCOPE SIGNAL PROCESSING APPARATUS USING SEQUENTIAL AND SYNCHRONOUS IMAGING DEVICES

BACKGROUND OF THE INVENTION

1. Field of the Invention

This invention relates to an endoscope signal processing apparatus wherein both of a field sequential type imaging means and a synchronous type imaging means can be used.

2. Related Art Statement

Recently, there is extensively used an endoscope (called a scope or fiber scope) whereby an organ or the like within a body cavity can be observed by inserting an elongate insertable part into the body cavity and any curing treatment can be made by using, as required, a treating tool inserted through a treating tool channel.

Also, there are suggested various electronic scopes wherein a solid state imaging device such as a charge coupled device (CCD) is used for the imaging means. Compared with the fiber scope, the electronic scope has advantages such as the resolution is higher, it is easier to record and reproduce picture images and picture image treatments such as the enlargement of picture images and the comparison of two picture images are easier.

Among the color picture image imaging systems of the above mentioned electronic scope, there are a field sequential system, wherein the illuminating light is switched sequentially to R (red), G (green) and B (blue) as shown, for example, in the gazette of a Japanese patent laid open No. 82731/1986, and a synchronous system (also called a color mosaic system) wherein a filter array in which color filters transmitting respectively such color lights as of R, G, and B are arranged in the form of a mosaic is provided on the front surface of a solid state imaging device as shown, for example, in the gazette of a Japanese patent laid open No. 76888/1985. The field sequential system has an advantage that the size can be made smaller than in the synchronous system. On the other hand, the synchronous system has an advantage that no color is displaced.

There are many kinds of the above mentioned electronic scope depending on the object of use. For example, an electronic scope in which the outside diameter of the insertable part is about 10 mm is used for the upper or lower digestive organ. On the other hand, for example, an electronic scope in which the outside diameter of the insertable part is about 5 mm is necessary for the bronchus. It is physically and functionally unreasonable to use the same kind of imaging device and the same kind of imaging system for various electronic scopes in which the outside diameters of the insertable parts are over a wide range. For example, in order to realize an electronic scope for the bronchus (small diameter), an imaging device of a small number of pixels must be used.

When the number of pixels is small, in order to prevent the reduction of the resolution, the field sequential type color imaging system whereby an object is field sequentially illuminated with lights of respective wavelengths of R, G and B and is field-sequentially imaged under these illuminations and the images are combined and color-displayed is more advantageous than the synchronous type imaging system wherein a color mosaic filter is used.

On the other hand, for the outside diameter of about 10 mm of the insertable part, it is advantageous in improving the picture quality to increase the number of pixels and to synchronize the imaging system.

Now, the above mentioned fiber scope or electronic scope is used generally as connected to a light source apparatus feeding an illuminating light adapted to each scope and a video processor processing video signals.

In the above mentioned fiber scope, field sequential type electronic scope and synchronous type electronic scope, the illuminating method and signal process are different. The conventional video processor corresponds to either of the field sequential type and synchronous type. Therefore, the use has to prepare respectively different video processors and make different operations depending on the kinds of the scope. It is low in economy and efficiency.

In the field sequential type and synchronous type, signals are processed partly in the same manner. However, the video processor is entirely independent of both imaging systems and therefore can not be used partly in common. In case the video processors of both imaging systems are prepared, the cost will increase and the apparatus will become large.

In case the video processor is independent of the field sequential type and synchronous type, the output ends will be respectively different. Therefore, when of displaying on a color monitor, the color monitor must be connected to the output end corresponding to the imaging system of the electronic scope to be used so that the operation is complicated.

In the gazette of a Japanese patent laid open No. 243625/1985, there is disclosed a connecting system whereby a fiber scope provided with an optical fiber bundle for transmitting images is connected to a controlling apparatus of a field sequential type electronic scope so that the image may be observed on the displaying picture surface of a monitor television or the like. However, in this system, a scope provided with a synchronous type imaging means can not be used.

Now, in a signal processing apparatus of an electronic scope of the above mentioned field sequential type, the signals read out of the solid state imaging device for the respective illuminating lights are A/D converted, are stored in the respective frame memories of R, G and B and are synchronously read out of the frame memories to produce a picture image signal. Therefore, by utilizing the above mentioned frame memories, the picture image can be frozen to display a stationary picture.

However, conventionally, there have been problems that at the time of freezing, a real time moving picture can not be displayed and information during freezing can not be obtained.

OBJECTS AND SUMMARY OF THE INVENTION

An object of the present invention is to provide an endoscope signal processing apparatus wherein both of a field sequential type imaging device and a synchronous type imaging device can be used.

Another object of the present invention is to provide an endoscope signal processing apparatus wherein both a field sequential type imaging device and a synchronous type imaging device can be used, the cost can be reduced and the formation can be simplified.

Further, another object of the present invention is to provide an endoscope wherein both a field sequential type imaging device and a synchronous type imaging device can be used and, even at the time of freezing picture images, a moving picture or a stationary picture different from the stationary picture during freezing can be displayed.

The endoscope signal processing apparatus of the present invention is provided with a first signal processing device processing the signal for a field sequential type imaging device and a second signal processing device processing the signal for a synchronous type imaging device. In another mode of the present invention, one signal processing device has a circuit partly used in common with the other signal processing device. Further, in another mode, an endoscope signal processing apparatus has a common output end through which video signals from both signal processing device are output. Further, in another mode, there are provided a discriminating device discriminating the imaging system of an endoscope to be connected and an output switching device selectively leading to the above mentioned common output end a video signal having passed through the signal processing device corresponding to the imaging system discriminated by this discriminating device.

Other features and advantages of the present invention will become apparent enough with the following explanation.

BRIEF DESCRIPTION OF THE DRAWINGS:

FIGS. 1 to 8 relate to the first embodiment of the present invention.

FIG. 1 is a block diagram showing the formation of an output circuit within an imaging apparatus body.

FIG. 2 (A) is a block diagram showing the formation of an imaging apparatus body.

FIG. 2 (B) is an explanatory view showing the formation of a synchronous type electronic scope.

FIG. 3 is an explanatory view showing the formation of a fiber scope fitted with a field sequential type externally fitted camera.

FIG. 4 is an explanatory view showing the formation of a fiber scope fitted with a synchronous type externally fitted camera.

FIG. 5 is an explanatory view showing the formation of a fiber scope.

FIG. 6 is a perspective view showing the entire system of an endoscope apparatus.

FIG. 7 is a block diagram showing the formation of a field sequential type process circuit.

FIG. 8 is a block diagram showing the formation of a synchronous type process circuit.

FIG. 11 is a block diagram showing the formation of an imaging apparatus body.

FIG. 12 is a block diagram showing the formation of an output circuit.

FIG. 13 is a perspective view showing connectors and connector receptacles.

FIG. 14 is an explanatory view showing a means for sensing a scope to be connected.

FIG. 15 is a perspective view showing the appearance of an endoscope.

FIG. 16 is a block diagram showing the formation of an imaging apparatus body.

FIG. 17 is an explanatory view showing the formation of a light source part.

FIG. 18 is an explanatory view showing a rotary filter.

FIG. 19 is an explanatory view showing the formation of a field sequential type process circuit.

FIG. 20 is a block diagram showing the formation of an imaging apparatus body.

FIG. 21 is a perspective view showing the appearance of an endoscope apparatus.

FIG. 23 is a block diagram showing an imaging apparatus body.

FIG. 24 (A) is an explanatory view showing a type signal generating circuit provided in a signal connector of a field sequential type electronic scope.

FIG. 24 (B) is an explanatory view showing a type signal generating circuit provided in a signal connector of a synchronous type electronic scope.

FIG. 25 is a circuit diagram showing an example of discriminating circuit.

FIG. 27 is an explanatory view showing a light source part.

FIG. 28 is a block diagram showing the formation of an imaging apparatus body.

FIG. 30 is a block diagram showing the formation of an imaging apparatus body.

FIG. 31 is a block diagram showing the formation of a switching controlling apparatus.

FIGS. 32 to 37 relate to the eleventh embodiment of the present invention.

FIG. 32 is a schematic diagram of the eleventh embodiment.

FIG. 33 is a block diagram showing the formation of an endoscope.

FIG. 34 is a perspective view showing an entire endoscope apparatus.

FIG. 35 is a block diagram showing an example of a field sequential type pre-process circuit. FIG. 36 is a block diagram showing an example of a synchronous type pre-process circuit.

FIG. 37 is a block diagram showing an example of a post-process circuit.

FIG. 38 is a block diagram showing the formation of an endoscope relating to the twelfth embodiment of the present invention.

FIG. 39 is a block diagram showing the formation of an endoscope apparatus relating to the thirteenth embodiment of the present invention.

DETAILED DESCRIPTION OF THE PREFERRED EMBODIMENTS

FIGS. 1 to 8 show the first embodiment of the present invention.

Figure 6:
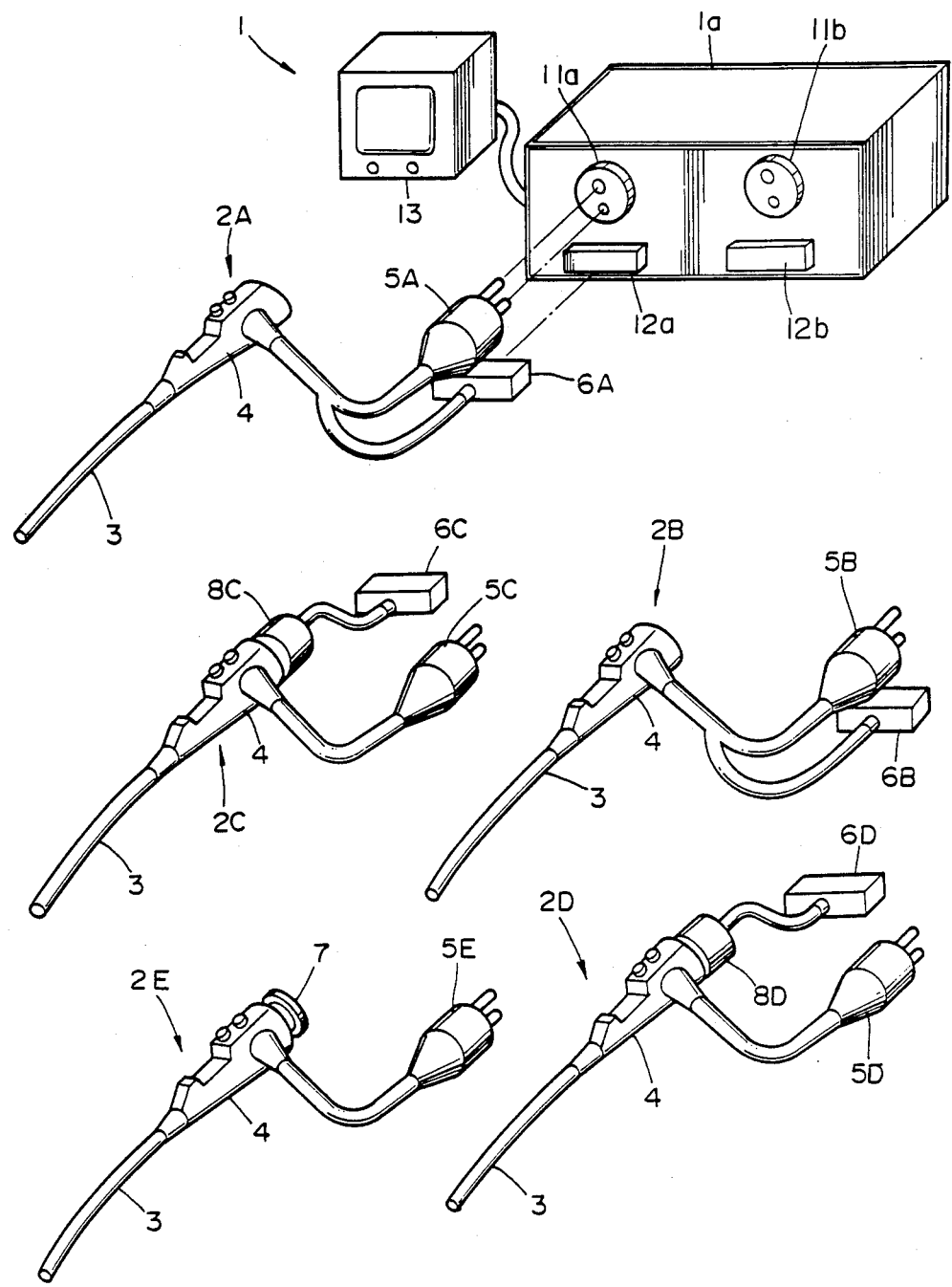

As shown in FIG. 6, an endoscope apparatus 1 is provided with an imaging apparatus body 1a which contains a light source apparatus and a video processor processing a video signal and to which any of scopes (endoscopes) 2A, 2B, 2C and 2E can be connected. There are five kinds of scopes as shown in the drawing, that is, a field sequential type electronic scope 2A, a synchronous type electronic scope 2B using a color mosaic filter, a fiber scope 2C externally fitted with a field sequential type television camera (which shall be mentioned as a fiber scope fitted with a field sequential type television camera hereinafter), a fiber scope 2D externally fitted with a synchronous type television camera (which shall be mentioned as a fiber scope fitted with a synchronous type television camera) and a fiber scope 2E.

Each of the above mentioned respective scopes 2A, 2B, 2C, 2D and 2E has an elongate insertable part 3 and an operating part 4 connected to the rear end side of this insertable part 3. A universal cord 5 is extended from this operating part and is provided at the tip with a light source connector 5A, 5B, 5C, 5D or 5E. In each of the field sequential type electronic scope 2A and synchronous type electronic scope 2B, a signal connector 6A or 6B is provided in addition to the light source connector 5A or 5B on the tip side of the above mentioned universal cord 5. The fiber scope 2C fitted with the sequential type television camera and fiber scope 2D fitted with the synchronous type television camera are fitted respectively with a field sequential type television camera 8C and synchronous type television camera 8D in the eyepiece part 7 of the fiber scope 2E. Signal connectors 6C and 6D are provided respectively at the tips of signal cables extended out of the respective television cameras 8C and 8D. Two sets of connector receptacles are provided on the front surface, for example, of a housing of the imaging apparatus body 1a so that the connectors 5A, 6A; 5B, 6B; 5C, 6C; 5D, 6D; 5E of the above mentioned respective scopes 2A, 2B, 2C, 2D and 2E (which shall be represented by the reference numeral 2 in common to all these scopes hereinafter) may be connected to set the respective scopes 2 in a unable state. These connector receptacles consist of a field sequential type light source connector receptacle 11a and field sequential type signal connector receptacle 12a and of a white light source connector receptacle 11b and synchronous type signal connector receptacle 12. The above mentioned field sequential type light source connector receptacle 11a is in a form that can connect the respective light source connectors 5A and 5C of the same shape of the field sequential electronic scope 2A and the fiber scope 2C fitted with the field sequential type television camera (these two scopes 2A and 2C are mentioned also as field sequential scopes). The field sequential type signal connector receptacle 12a adjacent to the lower side of the above mentioned field sequential type light source connector receptacle 11a is in a form that can connect the respective signal connectors 6A and 6C of the same shape of the field sequential type electronic scope 2A and the fiber scope 2C fitted with the field sequential type television camera, that is, of the field sequential type scopes 2A and 2C.

On the other hand, so that the light source connector 5B of the synchronous electronic scope 2B, the light source connector 5D of the fiber scope 2D fitted with the television camera (these two scopes 2B and 2D are mentioned also as synchronous type scopes) and the light source connector 5E of the fiber scope 2E may be respectively connected to the white light source connector receptacle 11b, these connectors 5B, 5D and 4E are in the same form. Also, so that the signal connector 6B of the synchronous type electronic scope 2B and the signal connector 6B of the fiber scope 2D fitted with the synchronous type television camera may be connected to the synchronous type signal connector receptacle 12b adjacent to the lower side of this white light source connector receptacle 11b, these connectors 6B and 6D are in the same form.

In case the above mentioned fiber scope 2E is connected to be used, a naked eye observation will be made but, in case the other scopes 2A, 2B, 2C and 2D are to be used, the image can be color-displayed by a color monitor 13 connected to the signal output end of the imaging apparatus body 3.

In this embodiment, the light source connectors 5A, 5B, 5C, 5D and 5E in the respective scopes 2 are provided with light guide connectors and air and water feeding connectors which can be thus connected to the connector receptacles 11a and 11b.

Figures 2A, 2B:
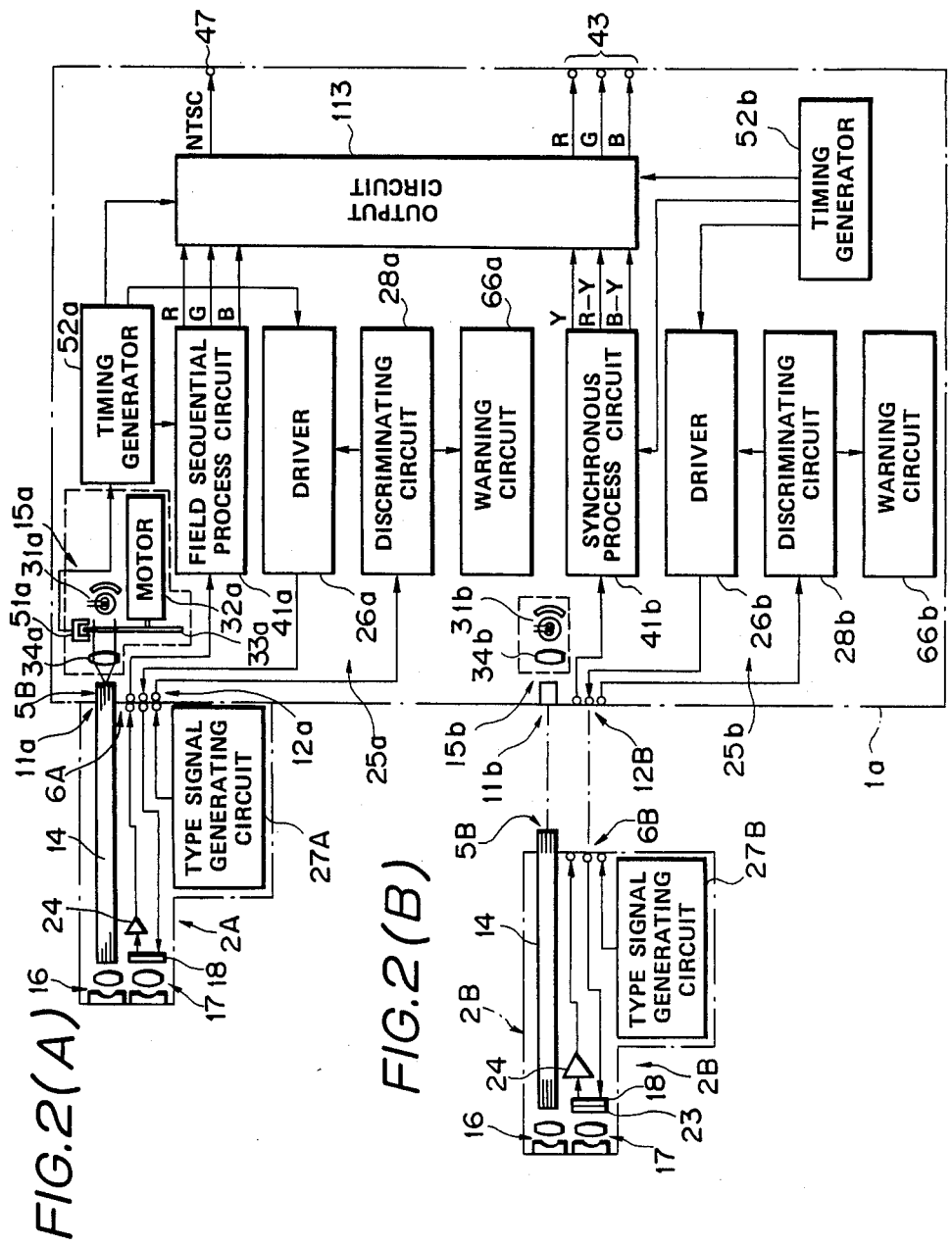
Figure 3:
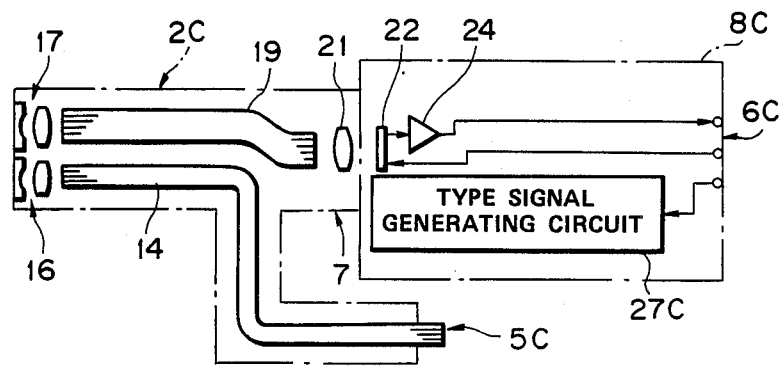
Figure 4:
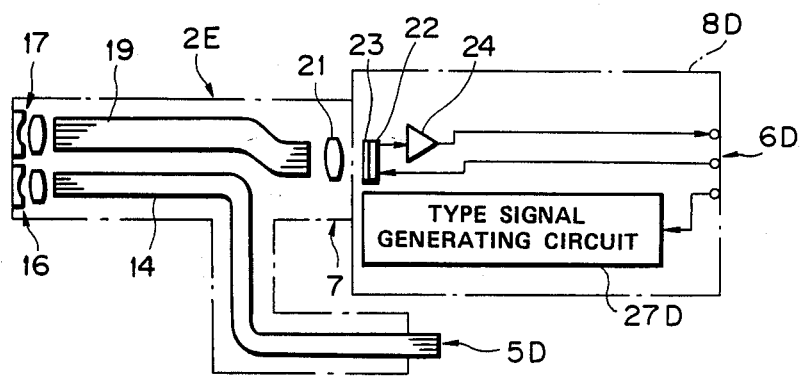
Figure 5:
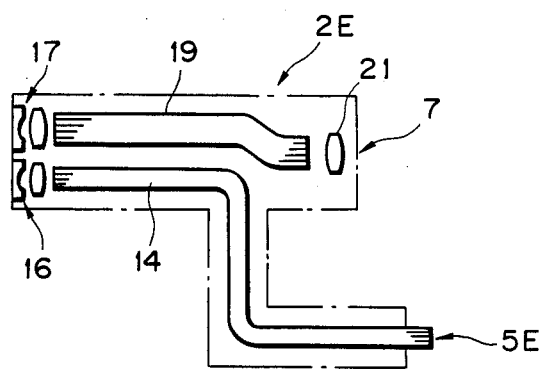

The interiors of the above mentioned respective scopes 2A, 2B, 2C, 2D and 2E are formed as shown respectively in FIGS. 2 (A), 2 (B), 3, 4 and 5.

A light guide 14 transmitting an illuminating light is inserted through each scope 2, the illuminating light fed to the entrance end surface of the light guide 14 from a light source part 15a or 15b within the imaging apparatus body 1a is transmitted to the exit end surface side and can illuminate the object side in front through a light distributing lens 16 arranged in front of this exit end surface.

In each of the above mentioned scopes 2, an image forming objective 17 is arranged in the tip part of the insertable part 3. In the field sequential type or synchronous type electronic scope 2A or 2B, a solid state imaging device 18 such as a CCD is arranged in the image forming position of this objective 17. On the other hand, in the fiber scope 2E or the fiber scope 2C or 2D fitted with the television camera 8C or 8D, the entrance end surface of the image guide 19 is arranged to be in the image forming position of the objective 17.

An eyepiece 21 is arranged as opposed to the exit end surface of the above mentioned image guide 19. In the fiber scope 2E, an observation can be made with a naked eye brought close to the eyepiece part 7.

On the other hand, where the field sequential type television camera 8C or synchronous type television camera 8D is fitted to the eyepiece part 7 of the fiber scope 2E, a solid state imaging device 22 is arranged (through an image forming lens not illustrated) as opposed to the eyepiece 21.

The optical image formed on the imaging surface is photoelectrically converted by the solid state imaging device 18 or 22, is amplified by a pre-amplifier 24, is then transmitted to the signal connector 6 (representing 6A, 6B, 6C or 6D) side through a signal transmitting line and is input into a video processor 25a or 25b through the signal connector receptacle 12a or 12b to which this connector is connected. A solid state imaging device driving clock is applied to the solid state imaging device 18 or 22 from a driver 26a or 26b of the above mentioned video processor 25a or 25b.

The other scopes than the fiber scope 2E are provided respectively with type signal generating circuits 27A, 27B, 27C and 27D outputting scope discriminating type signals so that the scope may be discriminated by a discriminating circuit 28a or 28b within the imaging apparatus body 1 through the signal connector 6.

Now, as shown in FIG. 2 (A), two sets of light source parts 15a and 15b and two sets of video processors 25a and 25b are contained within the imaging apparatus body 1a to which any of the above mentioned scopes 2 can be connected.

One light source part 15a is of a field sequential type and is provided with a light source lamp 31a emitting a white light and a rotary filter 33a having filters transmitting three primary colors of red (R), green (G) and blue (B) and driven by a motor 32a. The white light emitted out of the above mentioned light source lamp 31a is made illuminating light of the respective wavelengths of R, G and B successively through the above mentioned rotary filter 33a, is then condensed by a condenser lens 34a and is fed to the entrance end surface of the light guide 14.

The other light source part 15b is a white light source and is provided with a white light source lamp 31b emitting a white light. The white light emitted out of this white light source lamp 31b is condensed by the condenser lens 34b and is fed to the entrance end surface of the light guide 14 fitted to the connector receptacle 11b.

Now, one video processor 25a is for the field sequential type signal processing. The signal input into the signal input terminal of the field sequential type signal connector receptacle 12a is input into a field sequential type process circuit 41a and the signals imaged under the illuminating lights of the respective wavelengths of R, G and B are output as color signals R, G and B. These respective color signals R, G and B are converted to an NTSC system composite video signal by an output circuit 113 and are output out of the NTSC output end 47 and three primary color signals R, G and B are output of the RGB output ends 43.

A rotary position sensor 51a detecting the rotary position is provided in one place on the outer periphery of the rotary color filter 33a of the above mentioned field sequential type light source part 15a. The clock timing of a timing generator 52a is synchronized with the rotation of the rotary filter 33a by the output of this rotary position sensor 51. The output of this timing generator 52a controls the timing of the field sequential type process circuit 41.

Figure 7:
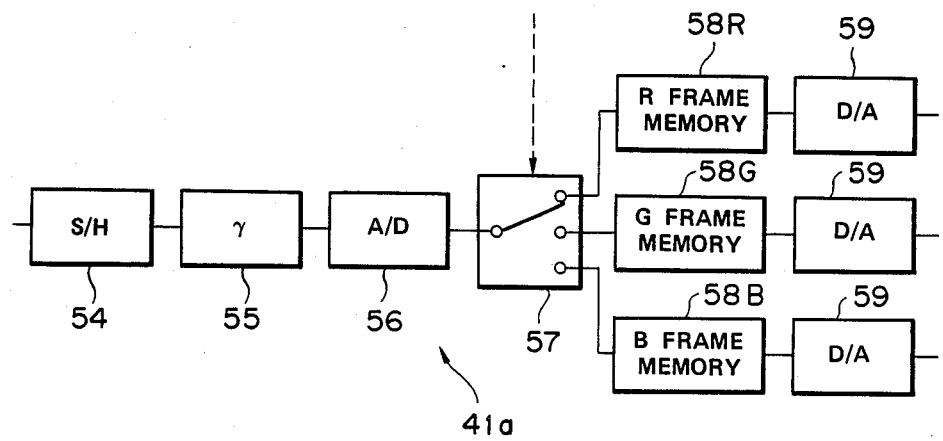

The above mentioned field sequential type process circuit 41a is formed as shown, for example, in FIG. 7.

That is to say, the signal input through a pre-amplifier is input into a sample holding circuit 54, is sample-held, is then $\gamma$-corrected by a $\gamma$-correcting circuit 55 and is converted to a digital signal by an A/D converter 56. The signals imaged under the field sequential illuminations of R, G and B through a multiplexer 57 switched by the signal of the above mentioned timing generator 52a are written into an R frame memory 58R, G frame memory 58G and B frame memory 58B. The signal data written into these respective frame memories 58R, 58G and 58B are read out simultaneously, are converted respectively to analogue color signals R, G and B by D/A converters 59 and are output in the above mentioned output circuit 113.

The other video processor 25b is for the synchronous type signal processing. The signal imaged by the solid state imaging device 18 or 22 through the synchronous type signal connector 12b is input into the synchronous type process circuit 41b to output a luminance signal Y and color difference signals R-Y and B-Y, is input into the above mentioned output circuit 113, is converted to an NTSC system composite video signal, is output out of an NTSC output end 47 in common with the signal imaged by the field sequential system, is converted to three primary color signals R, G and B and is output also out of a common RGB signal output end 43.

Figure 8:
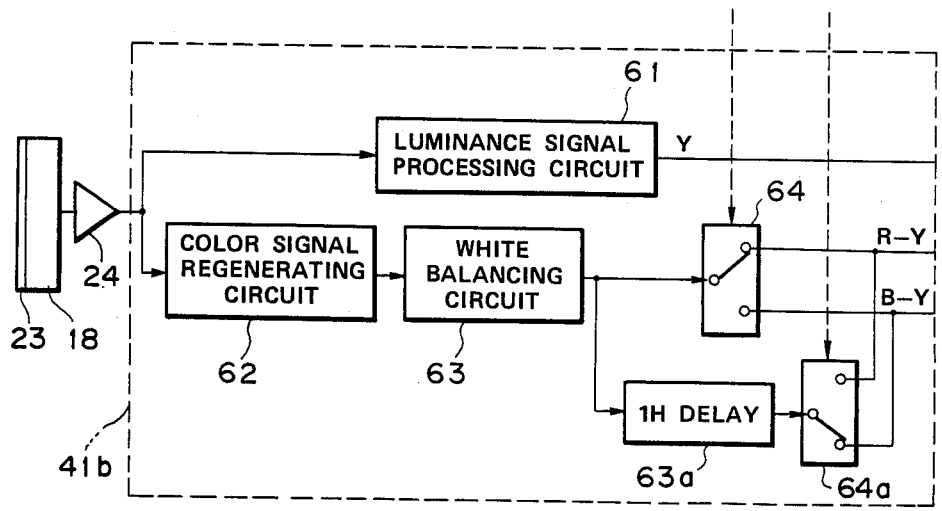

The above mentioned synchronous type process circuit 41b is formed as shown, for example, in FIG. 8. That is to say, the signal from the solid state imaging device 18 or 22 amplified by the pre-amplifier 24 is transmitted through a luminance signal processing circuit 61 to produce a luminance signal Y and is also input into a color signal reproducing circuit 62 to produce color difference signals R-Y and B-Y in each horizontal line in time series which are white balance-compensated in a white balance circuit 63. One of them is input directly into an analogue switch 64. The other is delayed by one horizontal line in a 1H delay line 63a and is input into an analogue switch 64a and color difference signals R-Y and B-Y are obtained by the switching signal of a timing generator 52b.

Now, the above mentioned output circuit 113 is formed as shown in FIG. 1.

That is to say, the color signals R, G and B from the above mentioned field sequential type process circuit 41a are input into a matrix circuit 44a to produce a luminance signal Y and color difference signals R-Y and B-Y. The luminance signal Y and color difference signals R-Y and B-Y output from this matrix circuit 44a and the luminance signal Y and color difference signals R-Y and B-Y from the above mentioned synchronous type process circuit 41b are input into a 3-circuit 2-contact switching switch 81. In this switching switch 81, when one contact side is selected, the signal of the above mentioned matrix circuit 44a will be output and, when the other contact side is selected, the signal of the above mentioned synchronous type process circuit 41b will be output. The output of this switching switch 81 is input into an NTSC encoder 45 and inverse matrix circuit 44b.

In this embodiment, an outline enhancing circuit 112 is provided between the above mentioned switching switch 81 and the above mentioned NTSC encoder 45 and inverse matrix circuit 44b. The luminance signal Y from the above mentioned switching switch 81 is input into the above mentioned NTSC encoder 45 and inverse matrix circuit 44b through this outline enhancing circuit 112. Therefore, the signal from the field sequential type process circuit 41a and the signal from the synchronous type process circuit 41b can be enhanced in the outline by the common outline enhancing circuit 112.

The video signal of the NTSC system converted by the above mentioned NTSC encoder 45 is output from the above mentioned NTSC output end 47 through a driver 46. The three primary color signals R, G and B converted by the above mentioned inverse matrix circuit 44b are output from the above mentioned RGB output end 43 through (coaxial cable) drivers 41.

The above mentioned switching switch 81 may be switched manually or may be switched to a process circuit 41a or 41b wherein a type signal output from the connected scope is used and is discriminated by the discriminating circuit 28a or 28b and the signal corresponding to the connected scope is processed with the discriminating signal.

The respective timing generators 52a and 52b apply signals respectively to the driver 42 and NTSC encoder and control to process signals synchronized with the driving pulse used to read signals out of the solid state imaging device 18 or 22. In this case, in the field sequential type video processor 25a, the above mentioned timing generator 52a is synchronized with the rotary color filter 33 by the output of a position sensor 51a. The above mentioned NTSC encoder 45 is formed to contain a buffer.

Now, the type signal generating circuits 27A, 27B, 27C and 27D are formed by connecting resistances of respectively different resistance values, for example, between two terminals. On the other hand, the discriminating circuits 28a and 28b can discriminate the connected scope of any resistance value by using a comparator of the resistance values between two terminals.

In case the signal connector 6B or 6D of the synchronous type electronic scope 2B or the fiber scope 8D fitted with the synchronous type television camera is connected, for example, to the field sequential type signal connector receptacle 12a, the resistance value not for the field sequential type will be discriminated by the discriminating circuit 28a and will be made known to the user by a warning sound in a warning circuit 66a by the discriminating signal or by flickering by an LED.

In case the connector 6A of the field sequential type electronic scope 2A or the connector 6C of the fiber scope fitted with the field sequential type television camera is connected to the synchronous type signal connector receptacle 12b, the connected scope will be discriminated by the discriminating circuit 28 and will be warned by the warning circuit 66b.

On the other hand, when the connector 6A or 6C of the field sequential type scope 2A or 2C is connected to the field sequential type signal connector receptacle 12a, the warning circuit 66a will not operate and no warning will be made. (A right connection may be indicated by indicated by lighting an ED.) Likewise, when the connector 6B or 6D is connected to the synchronous type scope 2B or 2D, the warning circuit 66 will not operate. (A right connection may be discriminated and indicated by lighting an LED in a position or color different from the case of warning.) In case two signal connectors are simultaneously connected to both signal connector receptacles 12a and 12b, the connection may be warned. In case a light source connector connection sensing means is provided inside the field sequential type light source connector receptacle 11a and the connector 5e of the fiber scope 2e is connected, the mis-connection can be made known. That is to say, in case the connector 5E is connected to the connector receptacle 11a and no connector is connected to the signal connector receptacles 12a and 12b, it will be warned.

Thus, in this embodiment, the field sequential type video processor 25a and the synchronous type video processor 25b are provided within the imaging apparatus body 1a. Therefore, the signals corresponding to the field sequential type scopes 2A and 2C and synchronous type scopes 2B and 2D can be processed and the object image imaged by the scopes can be displayed in the color monitor 13.

Further, the outline enhancing circuit 112, NTSC encoder 45 and driver 42 are in common with the above mentioned field sequential type video processor 25a and synchronous type video processor 25b. Therefore, as compared with the case that two sets of these circuits are provided independently for the respective imaging systems, the number of parts can be made smaller, the cost can be made lower and the circuit formation can be made simpler.

The circuits to be used in common for the field sequential type and synchronous type may be not only the above described circuits but also the line compensating circuit, frame memory, still picture memory, color burst generating circuit, power source, character generator, superimposing circuit, keyboard controller, tone adjusting circuit and auto g in control circuit.

A circuit evading these signal processing circuits may be provided so as to bypass them in case no signal is processed.

It this embodiment, not only the above mentioned field sequential type video processor 25a and synchronous type video processor 25b but also the field sequential type light source part 15a and white light source part 15b are provided within the imaging apparatus body la. Therefore, even if any of the field sequential type scopes 2A and 2C and the synchronous type scopes 2B and 2D is connected, the illuminating light feeding and signal processing corresponding to the connected scope can be made and the object image imaged by this scope can be color-displayed by the color monitor 13.

In case the fiber scope 2E is used, by connecting the light source connector 5E to the white light source connector receptacle 11b, a white light can be fed to this fiber scope 2E to make a naked eye observation.

Further, in this embodiment, in case a wrong scope is connected to the two sets of connector receptacle 12a and 12b provided in the imaging apparatus body 3, the discriminating circuit 28a or 28b can sense that it is not right connection and the warning circuit 66a or 66b can warn it.

Therefore, when one imaging apparatus body 1a is provided, scopes different in the color imaging system can be applied and even the fiber scope 2E can be simultaneously used. In case a wrong connection is made, it will be warned. Therefore, the apparatus is convenient to use. It is needless to say that, if the connectors 6 (connector receptacles 12) are made different in form between the field sequential type and synchronous type, the misconnection can be eliminated.

The signals processed for the above mentioned two color imaging systems coincide with each other in the output type. That is to say, they are made to coincide with three primary color outputs or NTSC type video signals and therefore the same color monitor 13 can be used. (This color monitor may be adapted to three primary colors or may input NTSC system video signals.)

In case the television camera 8C or 8D is fitted to the fiber scope 2E, the imaged picture image will be displayed in the color monitor 13. However, in case the television camera 8C or 8D is removed, the removal may be displayed on the picture surface of the color monitor 13. That is to say, for example, it may be displayed that the observation is being made with the fiber scope or a fixed picture image may be displayed.

Figure 9A:
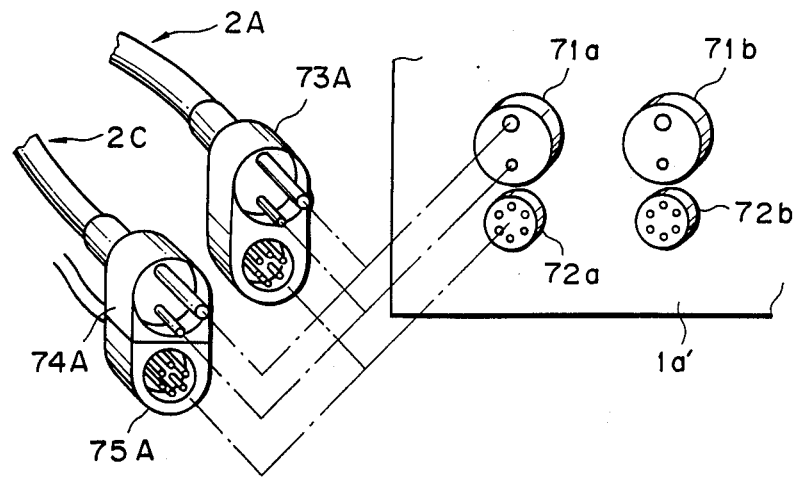
FIGS. 9 (A) and 9 (B) are perspective views showing modifications of connectors and connector receptacles in the first embodiment.
Figure 9B:
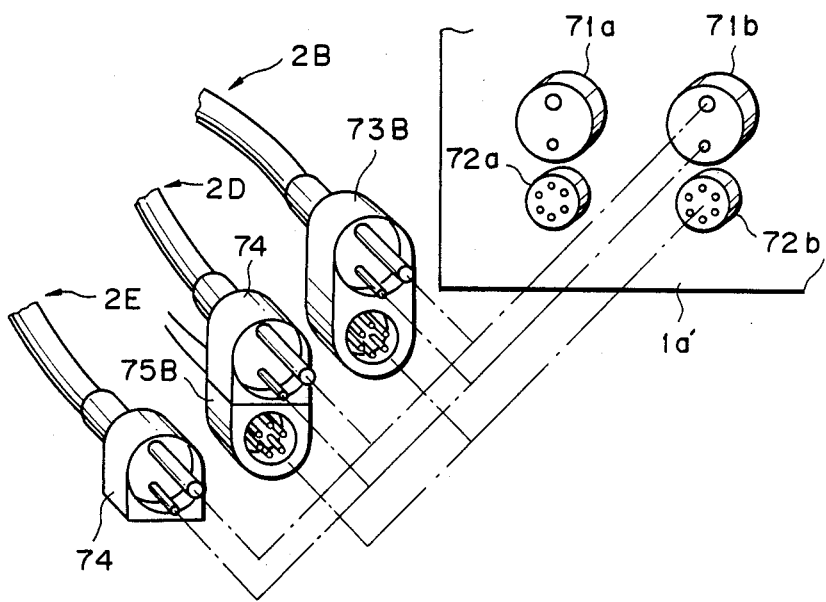

FIGS. 9 (A) and (B) show modifications of connectors and connector receptacles.

The image apparatus boy 1a' is provided with a round-shaped field sequential type light source connector receptacle 71a and signal connector receptacle 72a and a white light source connector receptacle 71b and color synchronous type signal connector receptacle 72 as separated on the front surface or the like of a housing. Both connector receptacles 71a and 71b or 72a and 72b are in the same form.

On the other hand, as shown in FIG. 9 (A), the field sequential type scope 2A is provided with a connector 73A integrating the light source connector part and signal connector part so as to be connectable to the field sequential type light source connector receptacle 71a and signal connector receptacle 72a.

Likewise, as shown in FIG. 9 (B), the synchronous the scope 2B is provided with a connector 73B connectable to the above mentioned white light source connector receptacle 71b and synchronous type signal connector receptacle 72b.

Also, as shown in FIG. 9 (A), in the fiber scope 2C fitted with a field sequential type television camera, when a light source connector 74A and signal connector 75A are combined with each other, they can be made in the same form as of the connector 73A of the above mentioned field sequential type electron scope 2A so as to be connectable to the field sequential type connector receptacles 71a and 72a. As shown in FIG. 9 (B), also, in the fiber scope 2D fitted with the synchronous type television camera, when a light source connector 74A and signal connector 75B are combined with each other, they can be made in the same form as of the connector 73B of the above mentioned synchronous electronic scope 2B so as to be connectable to the white light source connector receptacle 71b and signal connector receptacle 72b.

When the light source connector 74 of the fiber scope 2E is connected to the white light source connector receptacle 72b, a white light can be fed toward the light guide of the fiber scope 2E and a naked eye observation can be made.

In case a connection different from the connection shown in FIGS. 9 (A) and (B) is made, as explained in the first embodiment, the signal of the type signal generating circuit will be discriminated in the discriminating circuit by the connection of the signal connector and a warning will be issued.

Figure 10:
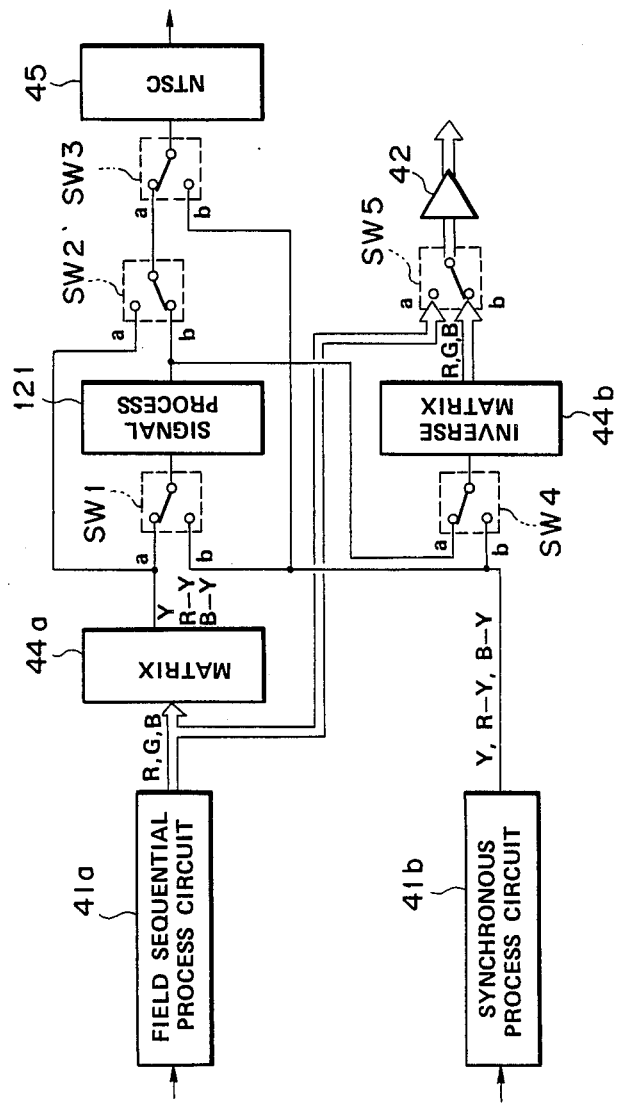
FIG. 10 is a block diagram showing the formation of an output circuit relating to a second embodiment of the present invention.

FIG. 10 shows the second embodiment of the present invention.

In this embodiment, such signal processing as enhancing the outline is made for (a luminance signal of) signals of either of the field sequential type and synchronous type and the signal processing can be selected.

As shown in FIG. 10, switching switches SW1 and SW2 are provided in front and rear of a signal processing circuit 121 in the rear of a matrix circuit 44a. Signals (a luminance signal Y and color difference signals R-Y and B-Y) from the above mentioned matrix circuit 44a are input into one switching contact a of the switching SW1 and signals (Y, R-Y and B-Y) from the synchronous type process circuit 41b are input into the other switching contact b. Also, signals from the above mentioned matrix circuit 44a not transmitted through the above mentioned signal processing circuit 121 are input into one switching contact a of the above mentioned switching switch SW2 and signals transmitted through the above mentioned signal processing circuit 121 are input into the other switching contact b. A switching switch SW3 is provided between the above mentioned switching switch SW2 and NTSC encoder 45. Signals from the above mentioned switching switch SW2 are input into one switching contact a of this switching switch SW3 and signals from the above mentioned synchronous type process circuit 41b not transmitted through the above mentioned signal processing circuit 121 are input into the other switching contact b.

On the other hand, a switching switch SW4 is provided in front of an inverse matrix circuit 44b. Signals from the above mentioned signal processing circuit 121 are input into one switching contact a of this switching switch SW4 and signals from the above mentioned synchronous type process circuit 41b are input into the other switching contact b. A switching switch SW5 is provided between the above mentioned inverse matrix circuit 44b and driver 42. Signals (three primary color signals R, G and B) from the field sequential type process circuit 41a not transmitted through the matrix circuit 44a, signal processing circuit 121 and inverse matrix circuit 44 are input into one switching contact a of this switching switch SW5 and signals (R, G and B) from the above mentioned inverse matrix circuit 44b are input into the other switching contact b.

The states of the above mentioned respective switches SW1 to SW5 in case the signal processing by the signal processing circuit 121 is made (on) or not (off) are as shown in the following logical table wherein the mark Δ shows that either side will do.

| Output | Logical Table Signal processing | SW1 | SW2 | SW3 | SW4 | SW5 |
|---|---|---|---|---|---|---|
| Frame sequential type | On | a | b | a | a | b |
| | Off | Δ | a | Δ | a | a |
| Synchronous type | On | b | b | a | a | a |
| | Off | Δ | Δ | b | b | b |

In this embodiment, by controlling the above mentioned respective switches SW1 to SW5 as shown in the logic table, whether the signals from the field sequential type process circuit 41a and the signals from the synchronous type process circuit 41b are to be processed or not can be selected.

Further, in case the signals from the above mentioned field sequential type process circuit are not processed, the R, G and B signals from the field sequential type process circuit 41a are not returned again to the R, G and B signals through the matrix circuit 44a and inverse matrix circuit 44b but are output directly from the R, G and B output ends through the switching switch SW5 and driver 42. Therefore, the deterioration of signals in case they are not processed can be prevented.

In the example shown in FIG. 10, the luminance signal Y and color difference signals R-Y and B-Y are processed. However, only the luminance signal may be processed.

FIGS. 11 to 14 show the third embodiment of the present invention.

In this embodiment, the signal side input ends of the electronic scopes 2 are made common.

Figure 13:
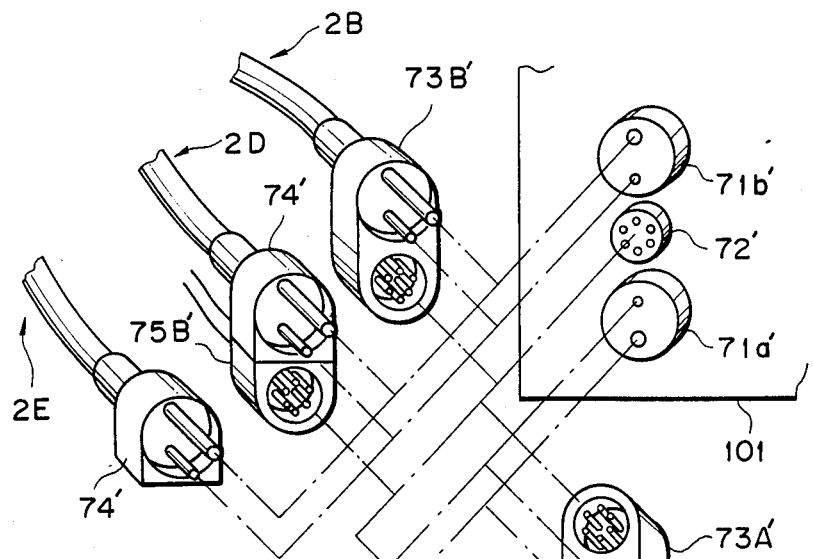

A signal connector receptacle 72' common with light source connector receptacles 71a' an 71b' of an imaging apparatus body 101 of this embodiment is in the form shown, for example, in FIG. 13. Both of connector 73A' of the field sequential type scope 2A and a connector 73B' of the synchronous type electronic scope 2B can have the respective signal connector parts connected to a common signal connector receptacle 72' and can have the light source connector parts connected to the light source connector receptacles 71a' and 71b' provided above and below. A light source connector 74' and signal connector 75A' of the scope 2C fitted with a field sequential type television camera and connectors 74' and 75B' of the scope 2D fitted with a synchronous type television camera can be connected likewise. Further, they can be connected to the connector receptacle 7y1b' of the fiber scope 2E.

Figure 11:
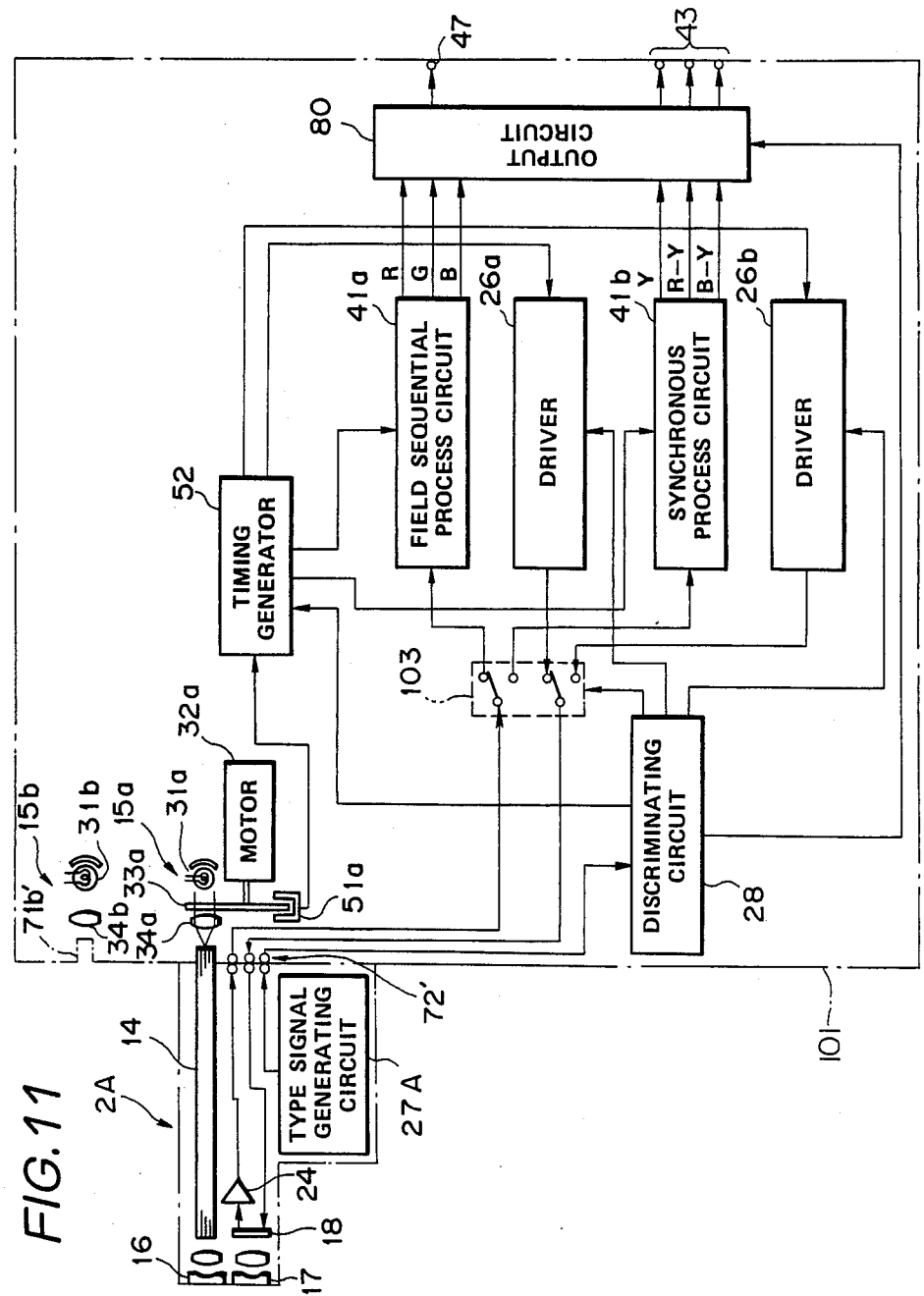
FIGS. 11 to 14 relate to the third embodiment of the present invention.

The internal formation of the above mentioned imaging apparatus body 101 is as shown in FIG. 11.

As shown in FIG. 11, for example, the output signal of a type signal generating circuit (for examples, 27A) input into the common discriminating circuit 28 through a signal connector receptacle 72' discriminates the connected scope by this discriminating circuit 28. This discriminating circuit 28 controls not only both drivers 26a and 26b as in the first embodiment but also the switching of a new provided switching switch 103. For example, as shown in FIG. 11, when the field sequential type scope 2A or 2C is connected, it will be switched to the field sequential side, the driving pulse of the driver 26a will be applied to a solid state imaging device 18 through a connector and the signal read out of the solid state imaging device 18 will be input into a field sequential process circuit 41a.

On the other hand, if the field sequential type process scopes 2A and 2C are not connected, the synchronous process circuit 41b side will be selected.

The case of the synchronous type scope 2B or 2D may be detected and a switching switch 103 may be switched to the synchronous type side.

The above mentioned discriminating circuit 28 can feed a control signal also to a timing generator 52 made common in part of the circuit and can cope with either system.

Figure 12:
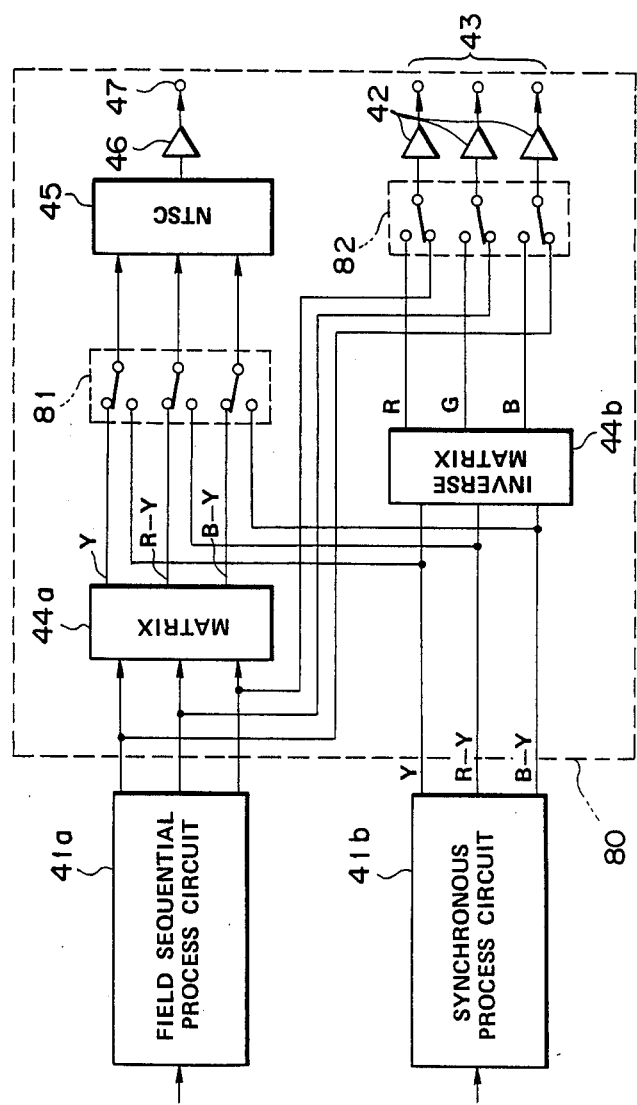

In this embodiment, the signal transmitted through the process circuit 41a or 41b is output out of a common output end through an output circuit 80 shown in FIG. 12. In this output circuit 80, color signals R, G and B from the field sequential type process circuit 41a are input into a matrix circuit 44a and a luminance signal Y and color difference signals R-Y and B-Y are produced. The luminance signal Y and color difference signals R-Y and B-Y output from this matrix circuit 44a and the luminance signal Y and color difference signals R-Y and B-Y from the above mentioned synchronous type process circuit 41b are input respectively into different switching contacts of a 3-circuit 2-contact switching switch 81. In this switching switch 81, when one contact side is selected, the signals of the above mentioned matrix circuit 44a will be output and, when the other contact side is selected, the signals of the above mentioned synchronous type process circuit 41b will be output. The outputs of this switching switch 81 are input into an NTSC encoder 45 and are converted to a video signal of the NTSC system by this NTSC encoder 45 and this video signal is output out of a common NTSC output end 47.

The luminance signal Y and color difference signals R-Y and B-Y from the above mentioned synchronous type process circuit 41b are input into an inverse matrix circuit 44b and are converted to three primary color signals R, G and B by this inverse matrix circuit 44b. The signals from this inverse matrix circuit 44b and the signals from the above mentioned field sequential type process circuit 41b are input into different switching contacts of a 3-circuit 2-contact switching switch 82. In this switching switch 82, when one contact side is selected, the signals of the above mentioned field sequential type process circuit 41a will be output and, when the other contact side is selected, the signals of the above mentioned inverse matrix circuit 44b will be output. The outputs of this switching switch 82 are output out of a common RGB output end 43 through (coaxial cable) drivers 42.

The above mentioned switching switches 81 and 82 can be respectively manually switched and can be switched as operatively connected. Also, the above mentioned switching switches 81 and 82 can be switched to the process circuit 41a or 41b wherein, as shown in FIG. 11, the type signal output from the connected scope is used and is discriminated by the discriminating circuit 28 and a signal process corresponding to the connected scope is made by the discriminating signal. For example, in case the connected scope is discriminated to be the field sequential type scope 2A or 2C, the switch will be switched to the field sequential side shown in FIG. 12.

Figure 14:
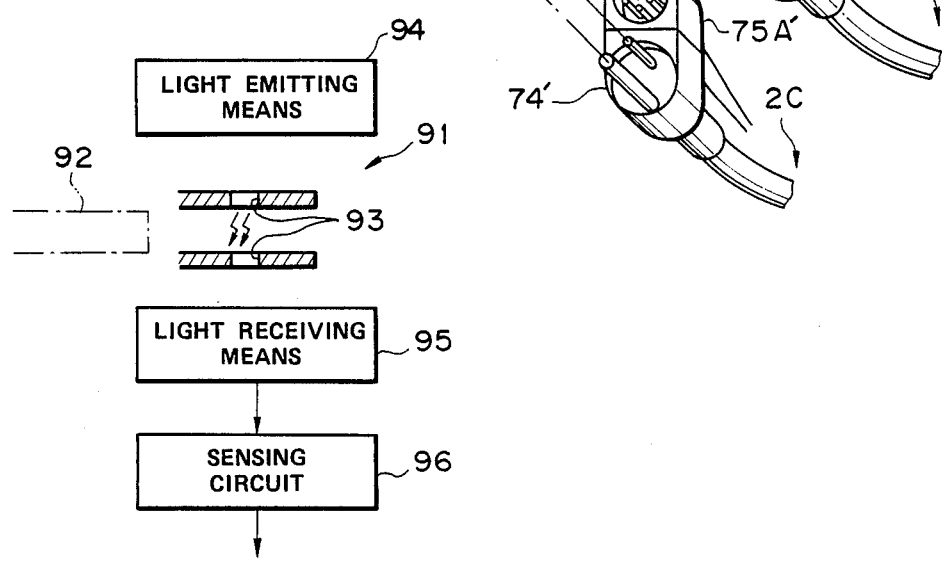

In case the above mentioned switching switches 81 and 82 are formed of analogue switches or the like, they can be automatically switched by a connection sensing apparatus 91 shown in FIG. 14.

For example, the field sequential type connector is provided with a discriminating pin 92 which is not provided in the synchronous type and, on the other hand, the field sequential type connector receptacle is provided with a recess engageable with this pin 92. Horizontal holes 93 are made on both opposed sides of this recess. A light emitting device 94 such as an LED and a light receiving device 95 such as a photodiode are arranged. The output of the light receiving device 95 is input into a sensing circuit 96. When the above mentioned pin 92 is engaged in the recess, the light to the light emitting device 94 will be intercepted, the output of the light receiving device 95 will vary from "L" to "H". This output variation is sensed by the sensing circuit 96 and the switching switches 81 and 82 are switched so that the field sequential side may be conductive. By the way, in case the output of the light receiving device 94 is "L", the synchronous type process circuit side will be selected.

A timing generator 52 applies signals to a driver 42 and NTSC 45 and controls to make a signal process synchronized with the driving pulse used to read signals out of the solid state imaging device 18 or 22.

The other formations are the same as in the first embodiment.

Thus, in this embodiment, the discriminating circuit 28, timing generator 52, NTSC encoder 45 and driver 42 are common to the field sequential type and synchronous type.

Also, in this embodiment, the signal input end (signal connector receptacle 72') and output end are common to the field sequential type and synchronous type so that the misconnection of the signal connector of the scope 2 to the signal connector receptacle of a different system may be prevented.

In FIG. 11, for example, the light source lamp may be moved and two light source parts 15a and 15b shown in FIG. 11 may be formed. Two light source lamps 31a and 31b may be made exchangeable by the rotating operation so as to be used as auxiliary lamps.

In this embodiment, if the light source connector of the fiber scope 2E is connected to the imaging apparatus body 101, a naked eye observation can be made the same as in the first embodiment.

In case only the connector 74' of the fiber scope 2E is connected to the white light source connector receptacle 71", the connection may be displayed.

In the second embodiment, the signal connector receptacle 72' is common but may be separate as shown in FIGS. 6 and 9.

In the output circuit 80 shown in FIG. 12, a circuit for processing the luminance signal and respective color signals of R, G and B may be provided in the rear of each of the switching switches 81 and 82.

No output circuit 80 may be provided and the output ends may be separate for the field sequential type and synchronous type.

Further, the output circuit 113 shown in FIG. 1 and the output circuit shown in FIG. 10 may be provided instead of the above mentioned output circuit 80.

Figure 15:
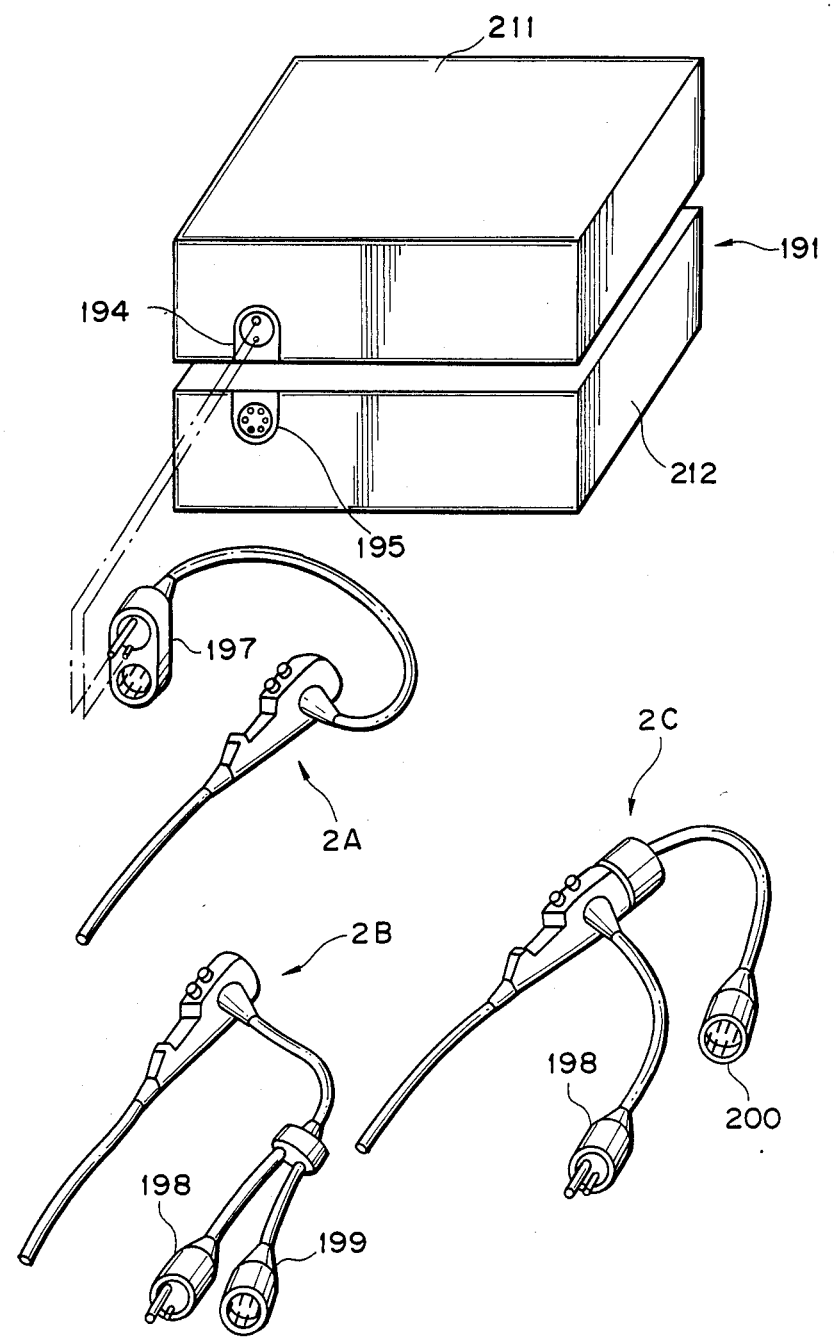
FIG. 15 and 16 relate to the fourth embodiment of the present invention.
Figure 16:
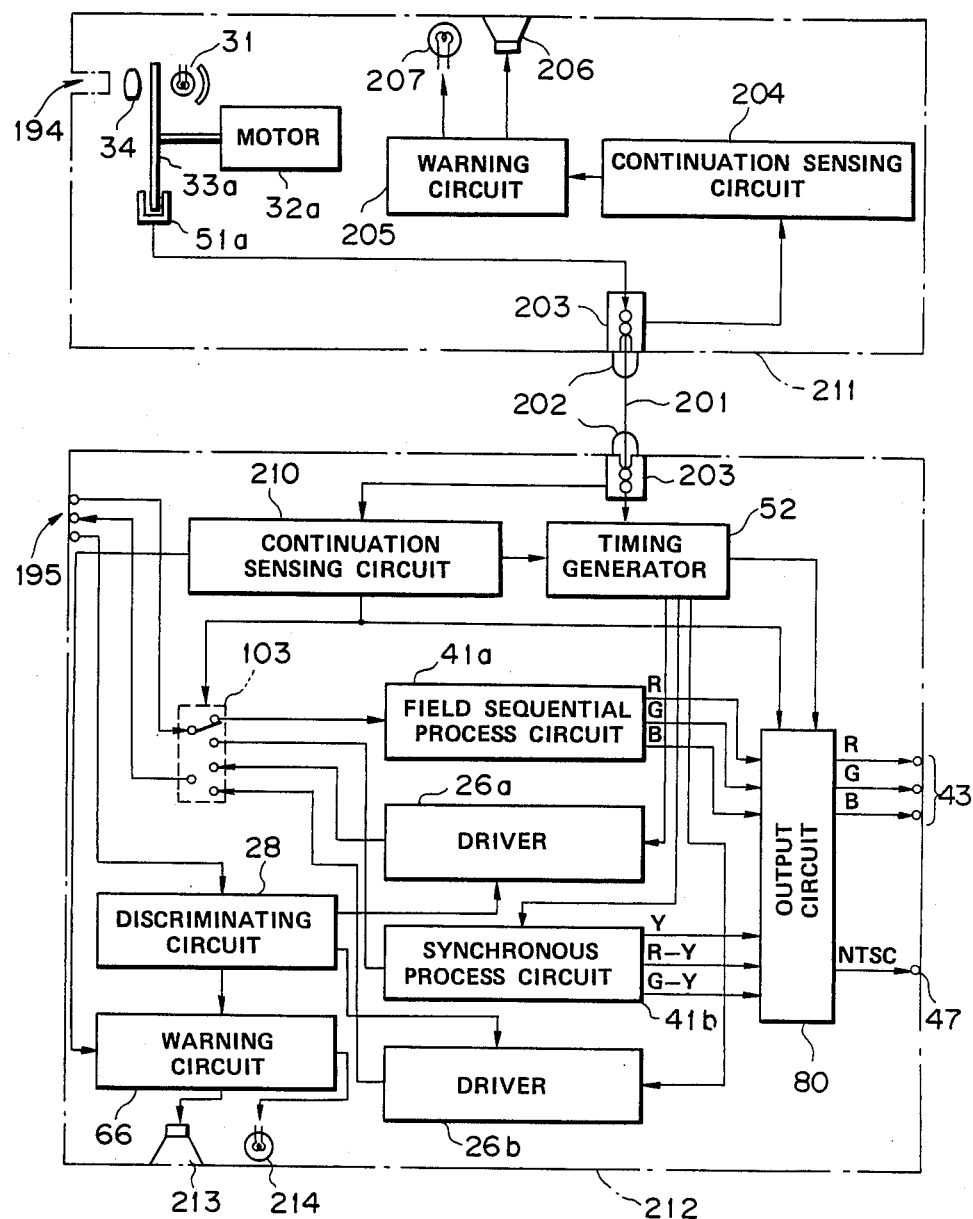

FIGS. 15 and 16 show the fourth embodiment of the present invention.

In this embodiment, as shown in FIG. 15, an imaging apparatus body 191 is separated into a light source part 211 and video processor part 212.

As shown in FIG. 15, a light source connector receptacle 194 is provided on the lower side on the front surface of the light source part 211. On the other hand, a signal connector receptacle 195 is provided on the upper side on the front surface of the video processor part 212. Both connector receptacles 194 and 195 are so provided as to be adjacent to each other above and below when the light source part 211 is overlapped on the upper surface of the video processor part 212.

On the other hand, in the field sequential type electronic scope 2A, a connector 197 has a light source connector part and signal connector part made integral and can be connected to both connector receptacles 194 and 195 when the light source part 211 and video processor part 212 are overlapped on each other as shown in FIG. 15.

On the other hand, for example, in the synchronous type electronic scope 2B, the connector is separated into a light source connector 198 and signal connector 199 which can be connected respectively to the connector receptacles 194 and 195. For example, in the fiber scope 2C fitted with a field sequential type television camera, the light source connector 198 and a signal connector 200 can be connected respectively to the connector receptacles 194 and 195. Also, the fiber scope 2D fitted with a synchronous type television camera not illustrated can be connected likewise to the above mentioned connector receptacles 194 and 195. In the fiber scope 2E, its light source connector can be connected to the above mentioned connector receptacle 194.

The above mentioned light source part 211 has a field sequential type light source part and white light source part provided separately. FIG. 16 shows an example of the field sequential type light source part. These field sequential type light source part and white light source part are of substantially the same formation as of the field sequential type light source part 15a and white light source part 15b shown in FIGS. 2 (A) and 11.

The above mentioned video processor part 212 is of substantially the same formation as of the video processor part within the imaging apparatus body 101 shown in FIG. 1. The signal input end and output end are common to the field sequential type and synchronous type.

In this embodiment, the timing generator 52a is provided on the video processor part 212 side. This video processor part 212 is provided with a connector receptacle 203 connecting one of connectors 202 of a cable 201 to feed a timing pulse of the above mentioned timing generator 52a to the light source part 212.

The above mentioned light source part 211 is provided with a connection sensing circuit 204 to sense whether the connector 202 of the signal cable 201 is connected to the connector receptacle 203 or not so that, in the case of the illumination by the field sequential type, if the cable 201 is not connected, by the connection sensing circuit 204, it will be warned by a buzzer 206 driven by a warning circuit 205 and by lighting a lamp 207.

On the other hand, the above mentioned video processor part 212 is provided likewise with a continuation sensing circuit 210 sensing whether the connector 202 of the signal cable 201 is connected to the connector receptacle 203 or not. The output of this continuation sensing circuit 210 is input into the warning circuit 66. When the field sequential type light source part 211 and the synchronous type scope 2B or 2D are used as combined with the video processor part 212 and when the white light source part and the field sequential type scope 2A o 2C are used as combined with it a warning will be made by the buzzer 212 driven by the above mentioned warning circuit 66 and by lighting a lamp 214.

Also, in this embodiment, the switching switch 103 and the switches 81 and 82 within the output circuit 80 are switched by the output of the above mentioned continuation sensing circuit. That is to say, when the field sequential type light source part 211 is connected to the video processor part 212, the above mentioned respective switches 103, 81 and 82 will be switched to the field sequential type side and, on the other hand, when the white light source part is connected to it, the respective switches 103, 81 and 82 will be switched to the synchronous type side. These switches 103, 81 and 82 may be switched manually or by the output of the discriminating circuit 28.

The other formation, operations and effects are the same as in the third embodiment.

In this embodiment, the signal connector receptacle 195 is made common but may be separate as shown in FIGS. 6 and 9.

Without providing the output circuit 80, the output end may be separate for the field sequential type and synchronous type.

Further, the output circuit 113 shown in FIG. 1 and the output circuit shown in FIG. 10 may be provided instead of the above mentioned output circuit 80.

The light source part 211 may be provided with the field sequential type light source part 15a and white light source part 15b as shown in FIG. 11. The light source lamp 31 may be movable. When the rotary filter 33a is made movable and is used as a field sequential type light source part, the rotary filter 33a may be interposed in the light path between the light source lamp 31 and lens 34. On the other hand, when the rotary filter 33a is used as a white light source part, the rotary filter 33a may be retreated from the light path between by light source lamp 31 and lens 34.

Figure 17:
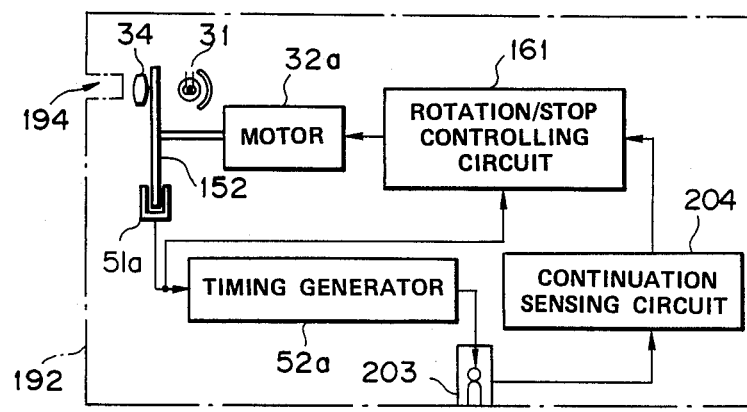
FIGS. 17 to 19 relate to the fourth embodiment of the present invention.
Figure 18:
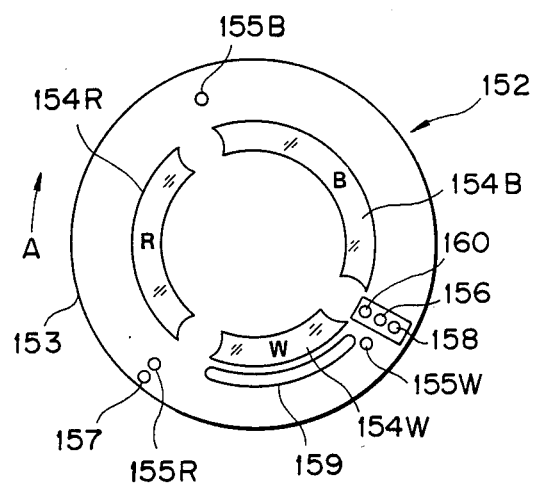

Further, instead of the above mentioned rotary filter 33a, such rotary filter 152 as is shown in FIG. 18 can be used to make the field sequential type illuminating lights R, W (white light) and B so that, as shown in FIG. 17, the light source lamp 31 may be used in common to output the field sequential type illuminating light and white light.

The above mentioned rotary filter 152 is provided with fan-shaped windows in a disc-like filter frame 153 as shown in FIG. 18. The respective windows are fitted respectively with R, W and B color transmitting fillers 154R, 154W and 154B transmitting respectively R, W and B. This W transmitting R, G and B. (It may be an approximately transparent plate to transmit all the white light.)

The R, G and B color transmitting filters 154R, 154W and 154B are so adjusted in the arcuate length as to be different in the illuminating period in response to the photosensitive characteristic of the solid state imaging device 18 or 22.

The above mentioned filter frame 153 is provided with leading pulse (detecting) holes 155R, 155W and 155B respectively near the ends (with respect tot he rotating direction A) of the R, W and B color transmitting filters 154R, 154W and 154B so as to be able to detect the leading time just after the illumination respectively with R, W and B. The positions of these leading pulse holes 155R, 155W and 155B can be detected by the fact that, in case the position opposed to a photosensor 156 arranged as opposed to hold the light emitting device and filter frame 153 is reached, the light of the light emitting device will be received like a pulse by the photosensor 156. When this pulse-like light is detected, as shown in FIG. 17, the detecting signal will be transmitted to the timing generator 52a and a driving pulse for reading out the solid state imaging device 18 or 22 will be applied through the driver 26a or 26b.

The above mentioned filter frame 153 in provided with a starting pulse hole 157 is a position radially adjacent, for example, to the leading pulse hole 155R. When this position reaches a position opposed to the photosensor 158, the photosensor 158 will output a starting pulse.

Further, in order to detect the position of the W color transmitting filter 154W, an arcuate slot 159 is formed in the peripheral outside position of this color transmitting filter 154W. By detecting this slot 159 with the photosensor 160, the position of the W color transmitting filter 154W can be detected. The output of this photosensor 160 controls the stopping position of the rotary filter 152. That is to say, in case the motor 32a rotating and driving the rotary filter 152 is not in a rotating and driving state, so that the stopping position of the rotary filter 152 may be the position in which the slot 159 is opposed to the photosensor 160, the output of the photosensor 160 is input into a rotation/stop controlling circuit 161 controlling the rotation/stop of the motor 32a to control the stopping position of the rotary filter 152. In this stopping position state, the illuminating light of the light source lamp 31 passes through the W color transmitting filter 154W, is opposed to the light source connector receptacle 71 and can feed a white illuminating light. When a fiber scope is connected to the connector receptacle 194 and nothing is connected to the connector receptacle 195 or nothing is connected to the connector receptacles 194 and 195 (both of these states are possible by detecting a high impedance state with the discriminating circuit) or when a synchronous type scope is connected, this white illuminating state will be made.

On the other hand, when a field sequential type scope is connected, the connection will be sensed by the discriminating circuit 28, an instruction signal to rotate and drive the motor 32a will be output to the rotation/stop controlling circuit 161, the motor 32a will be rotated and driven and a field sequential type illuminating state will be made.

Figure 19:
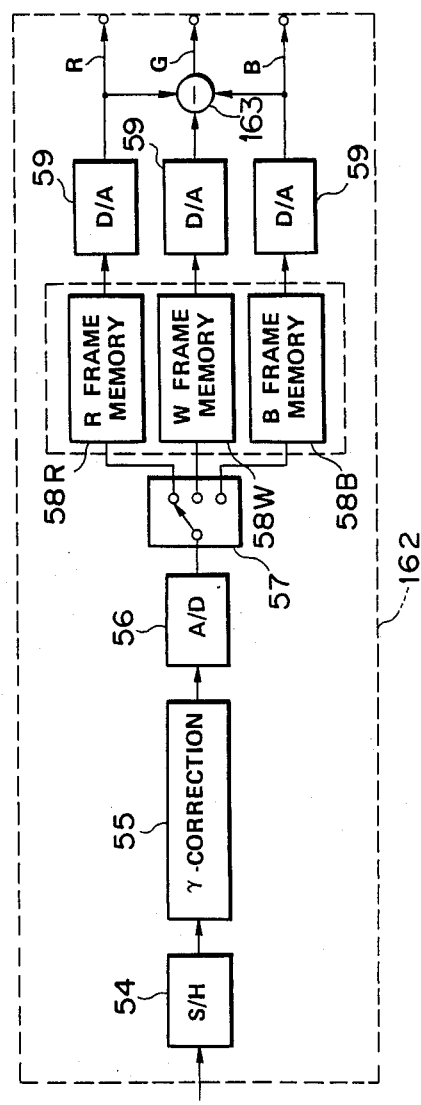

Now, in this embodiment, as the field sequential type illuminating light is not R, G or B, the field sequential process circuit 41a is formed as shown, for example, in FIG. 19. That is to say, in the process circuit 41a shown in FIG. 7, the G frame memory 58G is replaced with a W frame memory 58W (though the memory contents are different, the same frame memory can be used in the hardware). Further, the W color signal read out of W frame memory 58W and made an analogue signal by the D/A converter 59 is input into a deductor 163, has the R color signal and B color signal deducted and produces a G color signal. The others are the same as in the process circuit 41a shown in FIG. 7.

According to this example, both of the field sequential type and synchronous type use the light source part in common and the scope may be only connected to be used conveniently. It is not necessary to newly provide a moving means for moving the light source part and rotary filter part, the cost can be reduced and the size can be made small.

Also, in the above mentioned example, in the case of the field sequential type illumination, the illumination is made with R, W and B but is not limited to be made with only these. For example, the illumination can be made, for example, with R, G and W; W, G and B; Cy (cyanine), Ye (yellow) and W; Cy, W and Mg (magenta); W, Ye and Mg.

Figure 20:
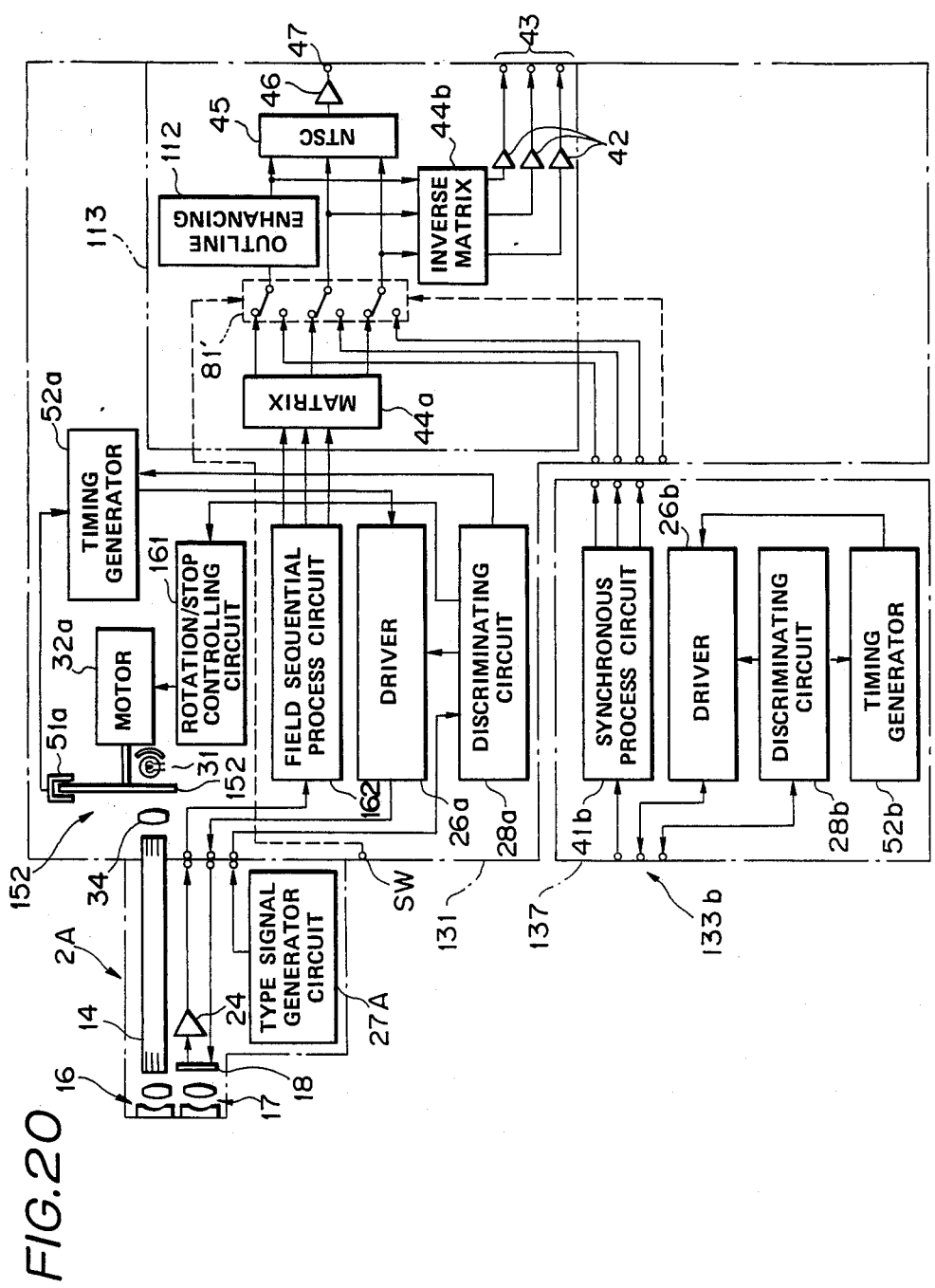
FIGS. 20 and 21 relate to the fifth embodiment of the present invention.
Figure 21:
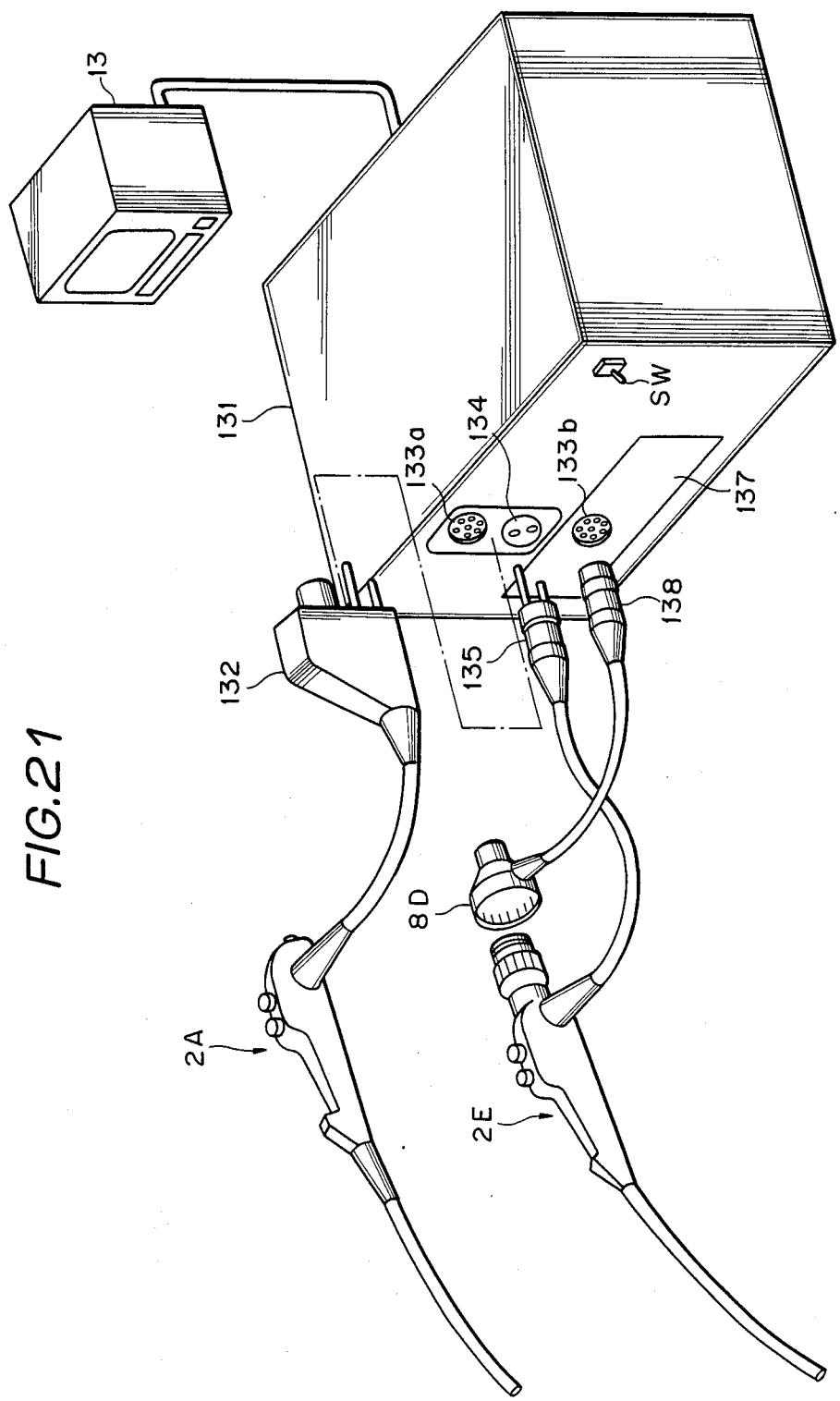

FIGS. 20 and 21 show the fifth embodiment of the present invention.

In this embodiment, the synchronous type process circuit can be removably used alone.

An imaging apparatus body 131 shown in FIG. 21 is provided with a light source connector receptacle 134 used in common with a field sequential type signal connector receptacle 133a so that a connector 132 of a field sequential type electronic scope 2A may be connected and a color-display can be made by the color monitor 13. A connector (not illustrated) of a fiber scope 2C fitted with a field sequential type television camera can be used as connected also to the above mentioned connector receptacles 133a and 134.

In the case of the fiber scope 2E, too, its connector 135 can be connected to the light source connector receptacle 134 to make an observation by a naked eye.

The light source part inside the above mentioned light source connector receptacle 134 which can make an illumination by a field sequence when the rotary filter 152 is rotated as shown in FIGS. 17 to 19 is used.

When the field sequential type signal connector is connected to the field sequential type signal connector receptacle 133a, the rotary filter 152 will be rotated by the then output type signal and the illumination by the above mentioned field sequence will become a field sequential type illumination.

Now, a recess is provided on the lower side on the front surface of the above mentioned imaging apparatus body 131 so that a synchronous pre-processor unit 137 may be plugged in to be fitted. A synchronous type signal connector receptacle 133b is provided on the front surface of this synchronous type pre-processor unit 137. A signal connector 138 of a synchronous television camera 8D or a signal connector (not illustrated) of a synchronous type electronic scope 2b can be connected to this connector receptacle 133b.

As shown in FIG. 20, not only the same light source part as in shown in FIG. 17 but also a field sequential type processor are contained within the above mentioned imaging apparatus body 131. This field sequential type processor is substantially the same as the field sequential type processor 25a shown, for example, in FIG. 2 (A) and further on its output side is the output circuit 113 provided with a function of processing outline enhancing signals as shown in FIG. 1. However, the field sequential type process circuit 162 shown in FIG. 19 is used instead of the field sequential type process circuit 41a.

The switching switch 81' within the output circuit 113 provided with this signal processing means can be switched when the synchronous type pre-processor unit 137 is plugged in.

According to this embodiment, the same as in the first embodiment, the outline enhancing circuit 112 can be commonly used in the field sequential type and synchronous type and the synchronous pre-processor unit 1371 can be used alone. That is to say, if an NTSC encoder is provided in the rear of the synchronous type process circuit 41b of the above mentioned synchronous type pre-processor unit 137, an NTSC system video signal will be obtained from this NTSC encoder.

If the synchronous type pre-processor unit 137 is later acquired (bought) as required, a synchronous type scope can be also used and the function of the apparatus can be economically expanded.

A switching switch SW is provided, for example, on the front surface of the imaging apparatus body 131 so that the field sequential type and synchronous type may be used as switched to each other even in case the above mentioned synchronous type pre-processor unit 137 is plugged in. The switching of the switching switch 81' can be controlled with this switch SW.

In this embodiment, the plug-in unit can be fitted to the front surface side but a synchronous type video processor unit or a part of it may be fitted in an expanding slot provided on the rear side or the like so as to be used for either of field sequential type and synchronous type scopes.

Figure 22:
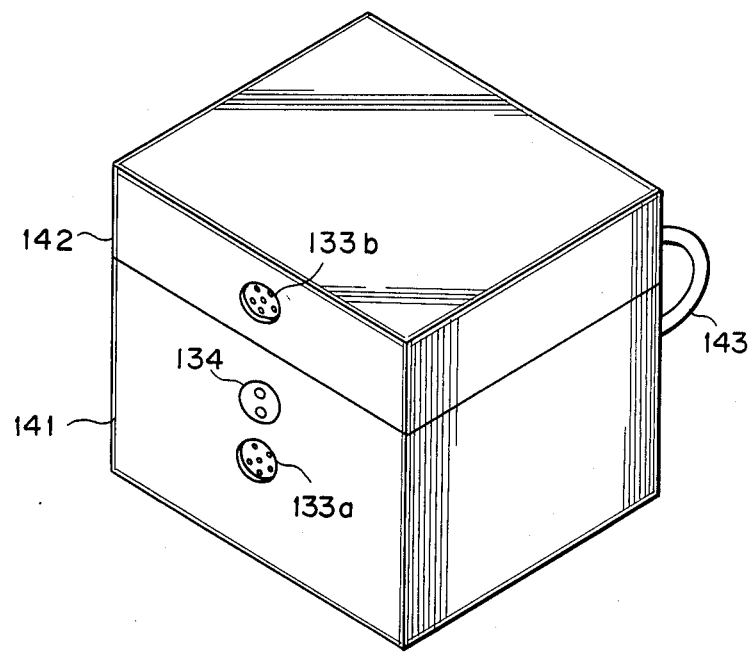
FIG. 22 is a perspective view showing an imaging apparatus body of a modification of the fifth embodiment of the present invention.

As shown in FIG. 22, a synchronous type video processor 142 is overlapped on the upper surface of an imaging apparatus body 141 provided with a signal processing means for a field sequential type scope and a signal cable 143 is connected from this synchronous type video processor 142 to the connector receptacle of the imaging apparatus body 141 so that they may be used for a scope of any system.

The above described connector receptacles 133a and 134 are provided on the front surface of the imaging apparatus body 141 and the connector receptacle 133b is provided on the synchronous type video processor 142.

In the apparatus shown in FIG. 20, a synchronous type unit can be fitted to the field sequential type imaging apparatus body 131 but a field sequential type unit can be also fitted to the synchronous type imaging apparatus body.

Thus, according to the first to fifth embodiments, both field sequential type imaging means and synchronous type imaging means can be used, a part of the signal processing means of both imaging systems is in common and therefore there are effects the cost can be reduced and the formation can be simplified.

Figure 23:
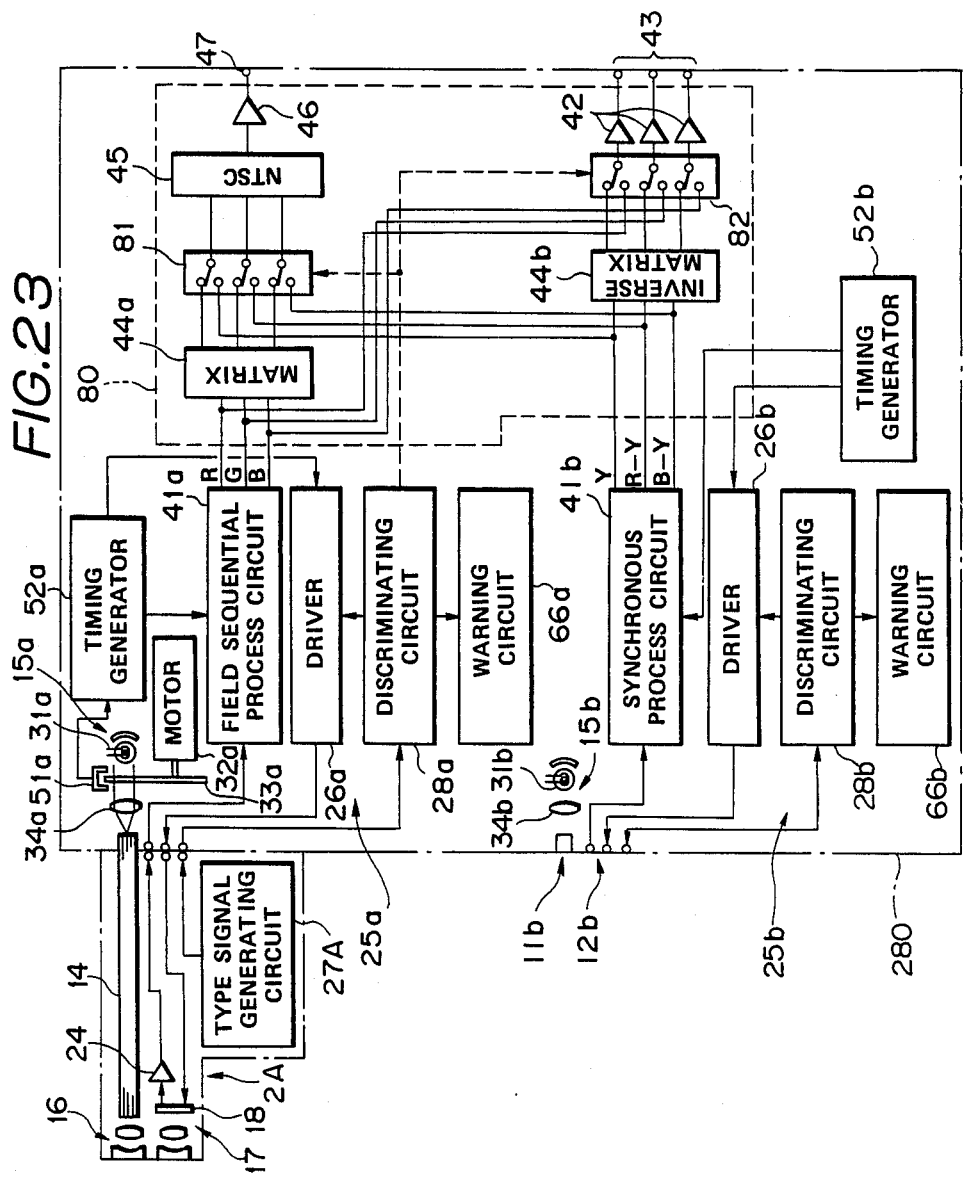
FIGS. 23 to 25 relate to the sixth embodiment of the present invention.
Figure 24A:
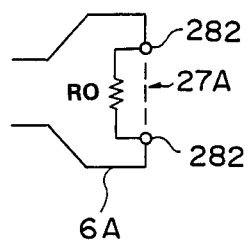
Figure 24B:
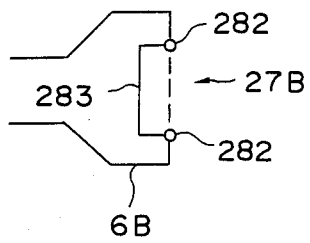
Figure 25:
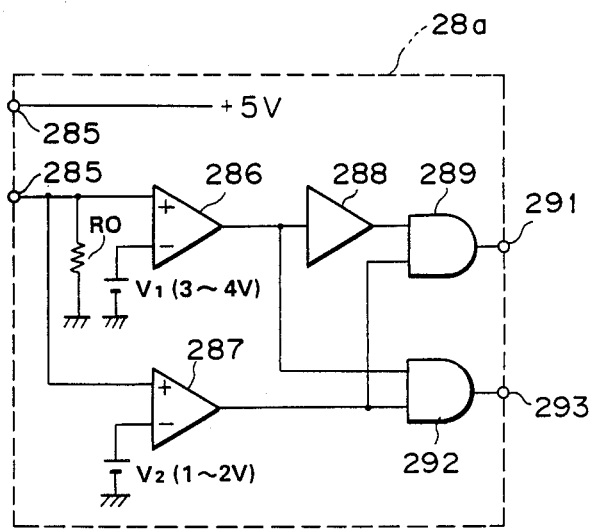

FIGS. 23 to 25 show the sixth embodiment of the present invention.

An imaging apparatus body 280 of this embodiment is provided with the output circuit 80 shown in the third embodiment instead of the output circuit 113 in the imaging apparatus body 1a of the first embodiment.

In this embodiment, the switching switches 81 and 82 of the above mentioned output circuit 80 are formed, for example, of analogue switches so as to be automatically switched by a switching control signal from the discriminating circuit 28a. That is to say, normally, both switching switches 81 and 82 are set to select the synchronous type signal processing system side. When the field sequential type scope 2A or 2C is connected and its type signal is discriminated by the discriminating circuit 28a, a switching control signal of "H" will be applied to the control end of the analogue switch and the yield sequential type signal processing system side will be switched to be selected as shown in FIG. 23.

Examples of the type signal generating circuits 27A and 27B and discriminating circuit 28a are shown respectively in FIGS. 24 (A) and (B) and FIG. 25.

The above mentioned type signal generating circuits 27A and 27B respectively connect the two terminals 282, for example, in the signal connectors 6A and 6B through a resistance $R_O$ of a proper value (for example, 220Ω) and short-circuit the two terminals 282 through a lead wire. On the other hand, as shown in FIG. 25, the discriminating circuit 28a has input terminals 285 connected with the above mentioned two terminals 282. One input end 285 is connected to a power source end, for example, of +5 V. The other end 285 is connected to the non-inverted input ends of comparators 286 and 287 and is earthed through a resistance $R_O$ for example, of 220Ω.

A voltage $V_1$, for example, of 3 to 4 V is applied to the inverted input end of one comparator 286 by a reference voltage source. A voltage $V_2$, for example, of 1 to 2 V is applied to the inverted input end of the other comparator 287 by the reference voltage sources. The output of one comparator through an inverter 288 together with the output of the other comparator 287 outputs a field sequential type scope discriminating signal out of a first output end 291 through an AND-circuit 289 of two inputs. The outputs of the above mentioned both comparators 286 and 287 are led to a second output end 293 through an AND-circuit 292 of two inputs.

The above mentioned first output end 291 outputs a signal of "H" so as to make a field sequential illumination and signal processing in case the field sequential type scope 2A or 2C is connected.

On the other hand, when the signal connector 6B or 6D of the synchronous type scope 2B or 2D is connected by mistake to the field sequential type connector receptacle 12a, the second output end 293 will become "H" and will output a warning instruction signal.

The two output ends 291 and 293 in the discriminating circuit 28a shown in FIG. 25 are replaced, the discriminating circuit 28a can be used as the discriminating circuit 28b on the synchronous type signal processing system side. The type signal generating circuit 27C of the field sequential type television camera 8C may be made equal to that of FIG. 24 9A). The type signal generating circuit 27D of the synchronous type television camera 8D may be made equal to that of FIG. 24 (B).

In the above mentioned discriminating circuit 28a, when a field sequential type scope is connected to the input ends 285, the respective comparators 286 and 287 will become respectively "L" and "H" (In case it is not connected, both comparators will be "L") and the output of the first output end 291 will become "H". On the other hand, in case the synchronous type scope side connector is connected, the outputs of both comparators 286 and 287 will become "H" and the output of the second output and 292 will also become "H".

The other formations are the same as in the first embodiment.

In the thus formed embodiment, the field sequential type and synchronous type use the output ends 43 and 47 in common. Therefore, the color-displaying color monitor 13 may be merely connected to the NTSC output end 47 or RGB output ends 43. Even if the connected scope is of a different color imaging system, it will not be necessary to change the connection of the color monitor 13 each time in response to the signal processing system. Also, switches 81 and 82 are provided within the output circuit 80 and are controlled to be switched by the discriminating circuit 28a discriminating the connected scope so that the output signal processed in response to the connected scope may be led to the common output ends 43 and 47 through these switches 81 and 82. Therefore, as the signal input into the color monitor 13 is automatically switched over to the signal processed in response to the connected scope, there is an advantage that no switching operation of the switch is required.

Both switching switches 81 and 82 of the above mentioned output circuit 80 may be manually switched.

The other operations and effects are the same as in the third embodiment.

Figure 26:
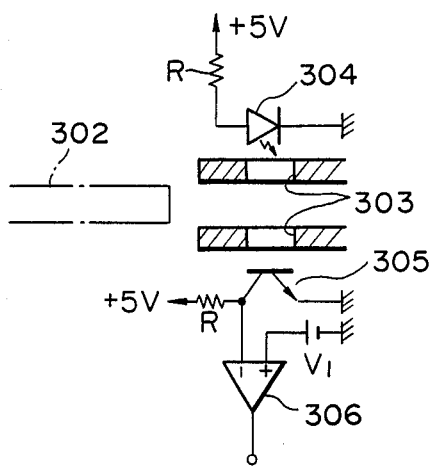
FIG. 26 is an explanatory view showing the formation of a discriminating circuit in the seventh embodiment of the present invention.

FIG. 26 shows a scope discriminating means in the seventh embodiment of the present invention.

For example, the field sequential type connector is provided with a discriminating pin 302 which is not in the synchronous type and the field sequential type connector receptacle is provided with a recess in which this pin 302 can be engaged. Horizontal holes 303 are made in both side parts opposed to this recess and such light emitting means as an LED 304 and such light receiving device as a phototransistor 305 are arranged. The output of the phototransistor 305 as a light receiving means is input into a discriminating circuit formed of a comparator 306 or the like. The above mentioned LED 302 is fed with an electric current from a current source, for example, of 5V, through a resistance R. The phototransistor 305 has its collector connected to +5 V through the resistance R and has its emitter grounded. This collector is connected to the non-inverse input end of the comparator 306 and is compared with the voltage $V_1$ connected to the inverse input end. This voltage $V_1$ is set, for example, at 2 to 3 V, normally the phototransistor 305 is conductive and therefore the output of this comparator 306 is "L". When the pin 302 is engaged in the recess, the light of the LED 304 will be intercepted and the output of the phototransistor 305 will become "H". This output variation is discriminated by the comparator 306. Its output becomes "H". The connected scope is discriminated and the switching switches 81 and 82 are switched.

In case the output of the phototransistor 305 as a light receiving means is "L", the synchronous type process circuit side will be selected.

When the discriminating means shown in FIG. 26 is provided to discriminate the synchronous scope, the misconnection can be discriminated. In such case, the discriminating pin may be different between the synchronous type and field sequential type.

Figure 27:
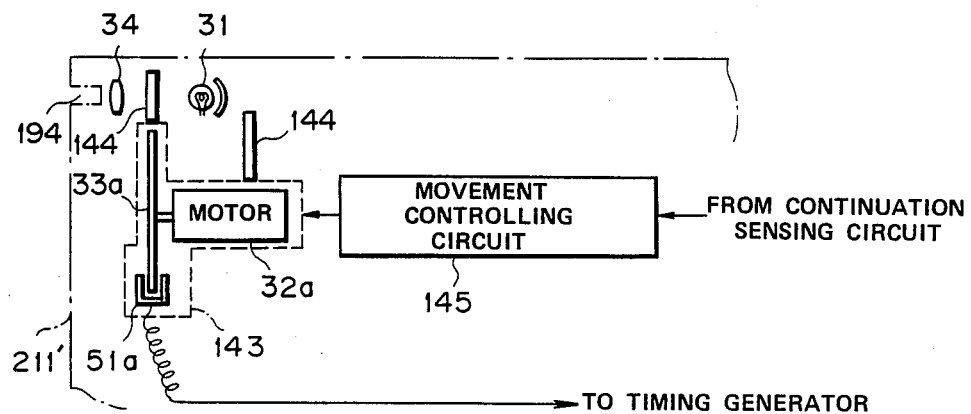
FIGS. 27 and 28 relate to the eighth embodiment of the present invention.
Figure 28:
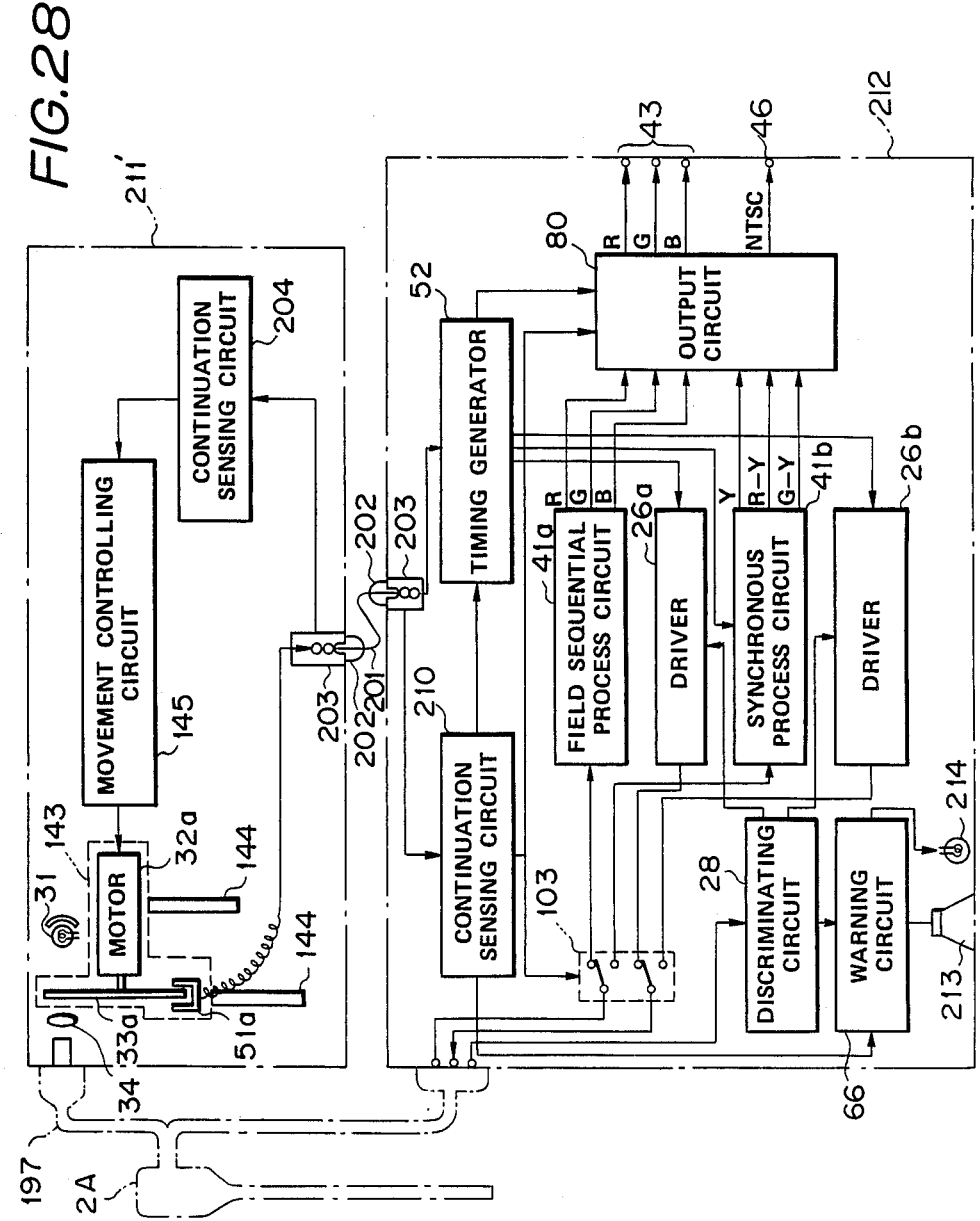

FIGS. 27 and 28 show the eighth embodiment of the present invention.

The same as in the fourth embodiment, in the imaging apparatus body of this embodiment, as shown in FIG. 15, the light source part 211′ and the video processor part 212 are made separate from each other. In this embodiment, the video processor part 212 is the same as is shown in the fourth embodiment but the light source part 211′ is different from the light source part 211 of the fourth embodiment.

In the above mentioned light source apparatus 211′, as shown in FIG. 27, the rotary filter pat 143 having the rotary filter 33a, motor 32a and rotary position sensor 51a is movable along the rails 144.

The above mentioned rotary filter part 143 is normally set in one end part of the rails 144. As shown, for example, in FIG. 27, when the rotary filter 33a has retreated from the light path between the light source lamp 31 and lens 34, a white light source part will be formed. On the other hand, when the rotary filter part 143 is moved to the lower side of the rails 144 from this state, as shown in FIG. 28, the rotary filter 33a will be interposed in the light path to form a field sequential type light source part.

Now, the above mentioned rotary filter part 143 is controlled in the movement by a movement controlling circuit 145. This movement controlling circuit 145 is operated by the connection sensing signal of a connection sensing circuit 204. In this embodiment, when it is sensed by the connection sensing circuit 204 that a cable 201 is connected to the light source part 211′ and video processor part 212, a movement controlling instruction will be output to the movement controlling circuit 145 and the rotary filter part 143 will be moved from the state shown in FIG. 27 to the state shown in FIG. 28.

On the other hand, in the case of the use by connecting the connector of the synchronous type scope 2B or 2D, the above mentioned cable 201 will not be connected, therefore the rotary filter part 143 will not be moved and a white light will be fed. Also, in case the fiber scope 2E is connected, a white light will be fed to the connector of the fiber scope 2E.

When the use with the field sequential type scope 2A or 2C ends and the cable 201 is disconnected, the rotary filter part 143 will be returned as retreated from the light path.

In this embodiment, by the output of the connection sensing circuit 204, that is, by the output of sensing that the cable 201 has been connected between the light source pat 211′ and video processor part 212, the switching switch 103 is switched to select the field sequential type side. Needless to say, as in the third embodiment, the switching switch 103 may be switched by the output of the discriminating circuit 28.

Thus, in this embodiment, the same as in the fourth embodiment, the light source part 211' and video processor 212 are made separate from each other therefore can be respectively made light and are convenient to move. When used with only the fiber scope 2E, the video processor part 212 will be unnecessary. In such a case, there is an advantage that the apparatus can be used with only the required light source 211'.

The output circuit 113 shown in FIG. 1 or such output circuit as is shown in FIG. 10 may be provided instead of the output circuit 80 in the video processor 212.

The other formations, operations and effects are the same as in the fourth embodiment.

In the eighth embodiment, the light source part may be made separate respectively for the field sequential type and the synchronous type.

Figure 29:
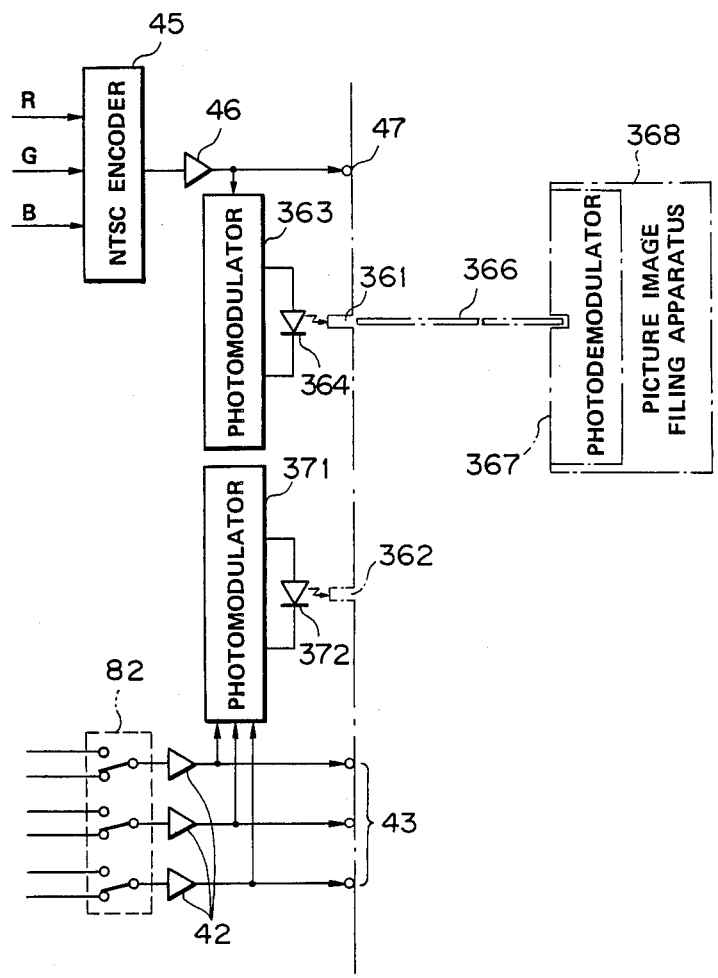
FIG. 29 is an explanatory view showing the output end periphery of an output circuit in the ninth embodiment of the present invention.

FIG. 29 shows the ninth embodiment of the present invention.

In this embodiment, not only the RGB output ends 43 and NTSC video output end 47 of the output circuit 80 shown in FIG. 23 but also light modulation output ends 361 and 362 are provided.

The output of the driver 46 is modulated by a light modulator 363 and the modulated light emitted from an LED 364 is output from one output end 361. An optical fiber bundle 366 is connected at one end to a connector receptacle as a light modulation output end 361 and at the other to a light demodulator 367. The modulated light from the above mentioned LED 364 is input into the above mentioned light demodulator 367 through the above mentioned optical fiber bundle 366 and is input into a monitor or picture image filing apparatus 368 through this light demodulator 367.

In the same manner, the R, G and B primary color signals are also input into the light modulator 371 respectively through the drivers 42, are converted to modulated lights of an LED 372 and are input into the monitor or picture image filing apparatus 368 through a connector connected to a connector receptacle.

Thus, there is an advantage that, when transmitting a signal with a modulated light to a color monitor or picture image filing apparatus 368 set in another room, for example, of a hospital, there will be substantially less influence of external noises issued by motors and other electric devices than when transmitting the signal with an electric signal. Also, a lot of information can be transmitted as multiplexed by using the optical fiber bundle 366.

Figure 30:
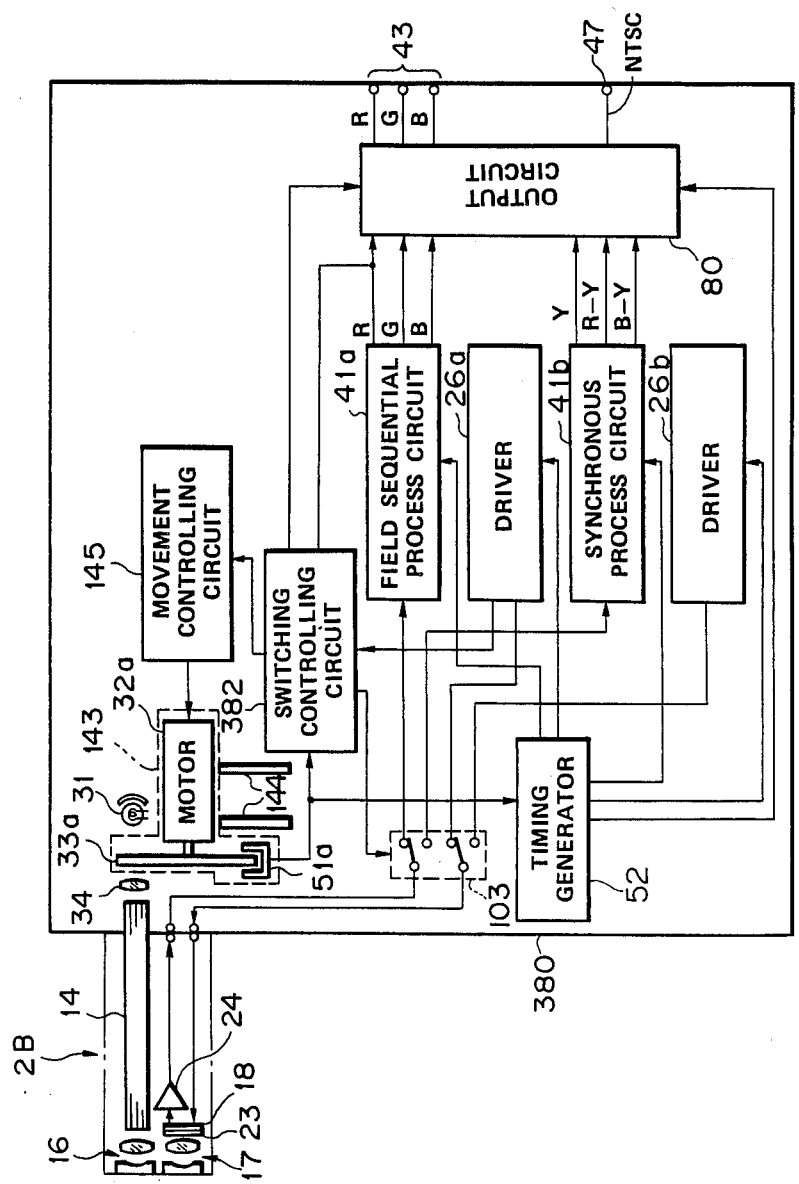
FIGS. 30 and 31 relate to the tenth embodiment of the present invention.
Figure 31:
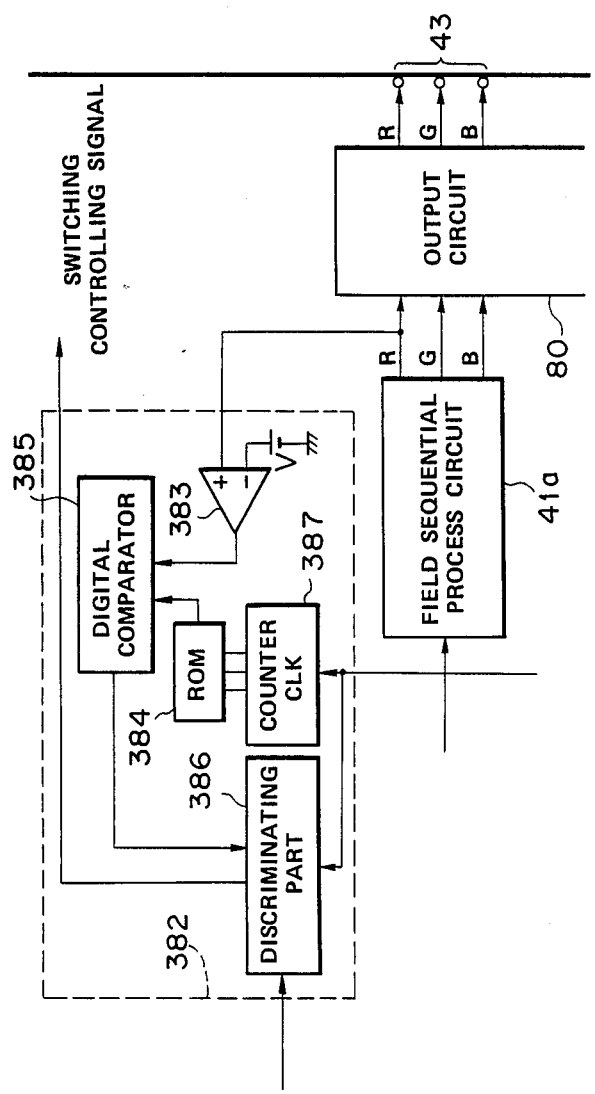

FIGS. 30 and 31 show the tenth embodiment of the present invention.

In the imaging apparatus body 380 of this embodiment, the video processor side is of substantially the same formation as the imaging apparatus body 101 of the third embodiment and the light source apparatus side is of the same formation as in the eighth embodiment wherein a white light and field sequential type light can be output by moving the rotary filter part 143.

In this embodiment, the discriminating circuit 28 is not provided. The type signal generating circuit 27 is not provided in any scope 2 (the synchronous electronic scope 2B is shown in FIG. 30). When the connected scope is discriminated to be of the field sequential type, the field sequential type illumination and field sequential type signal process will be made.

In case the field sequential type scope 2A or 2C and the synchronous type scope 2B or 2D are connected, the above mentioned switching controlling circuit 382 will control the movement controlling circuit 145 for the discrimination to set it in the field sequential type illuminating state and to set the switch 103 so that the field sequential type signal processing system may be selected. By the output of the sensor 51a, for example, the red illuminating state ends and the imaging signal in the illuminating state is stored in the frame memory 58R within the field sequential type process circuit 41a. When the signal data of this frame memory 58R are read out, as shown in FIG. 31 the signal data of the above mentioned frame memory 58R will be input into a comparator 383 forming the switching controlling circuit SB2 through the D/A converter 59 and will be compared with the reference level V. This reference level V is set to be somewhat larger than the dark current (zero) level. When a signal imaging such general object as a body cavity interior is input, the output of this comparator S8S will become "H". However, when the mosaic filter 2S is provided in front of the imaging surface of the CCD 28 or 22, the output of the other pixels than of the red transmitting filter will be substantially on the dark current level and therefore will become "L".

Therefore, the output of this comparator 383 and the output of a ROM 384 having stored the data corresponding to the arranged pattern of the red transmitting filter are input into a digital comparator SB5 and the output is discriminated by a discriminating part 386 formed of a CPN or the like so as to be able to discriminate whether the output of the field sequential type process circuit 41a is the synchronous type scope 2B or 2D imaged through the mosaic filter or the field sequential type scope 2A or 2C not through the mosaic filter. By the output of this discriminating part S86, the switch 108 is switched, the switches 82 and 82 within the output circuit 80 are switched and the movement controlling circuit 145 is controlled. In red arranged pattern information of the mosaic filter is read out of the ROM S84 by the address signal output from a counter 387.

In the above mentioned discriminating part 386, the switches 103, 81 and 82 are set so that the white illumination and synchronous type signal processing system may be in an operating state in case the 2-valued signal output from the comparator 383 coincides with the red arranged pattern of the mosaic filter and so that the field sequential type illuminating state and field sequential type signal processing system may be selected in case it does not coincide with the red arranged pattern.

According to this embodiment, without providing a type signal generating circuit on the scope side, whether the field sequential type scope or the synchronous type scope is connected can be automatically discriminated.

In this embodiment, for example, the ROM 384 storing the red arranged pattern is provided but the switching of the switch or the like may be controlled by discriminating that the output of the comparator 383 shows a specific pattern.

The driving signal in the horizontal direction is added by the number of clocks larger than the number of pixels in the horizontal direction, the number of clocks at which the output level is the dark current level is sensed and the number of driving signals and frequency of the driver can be automatically set at proper values.

Further, in this embodiment, the synchronous type and field sequential type are discriminated in switching the illuminating state and signal processing system but the number of pixels may be discriminated in switching.

In the first to tenth embodiments, the signal is transmitted between the imaging scopes 2A, 2B, 2C and 2D and the signal processing side through the electric connector means. However, the present invention is not limited to this. The signal may be transmitted and received by a light coupling. In such case, for the power source, a battery may be contained in the operating part of the like of the scope or the light by the light guide may be fed by a device having an electromotive force such as a solar battery.

The field sequential type and synchronous type television cameras as made integral may be fitted to the eyepiece part of the fiber scope 2E so as to be able to be used as switched by a switching switch or the like. In such a case, the light source side illuminating system and signal processing system are also switched as operatively connected with the switching. Thus, for example, the synchronous type may be used to observe a moving part and the field sequential type may be adopted in the case of observing with an image high in resolution.

Also, the light source may be provided within the scope.

Different embodiments can be formed also by combining parts of the above mentioned respective embodiments and belong to the present invention.

FIGS. 32 to 37 show the eleventh embodiment of the present invention.

Figure 32:
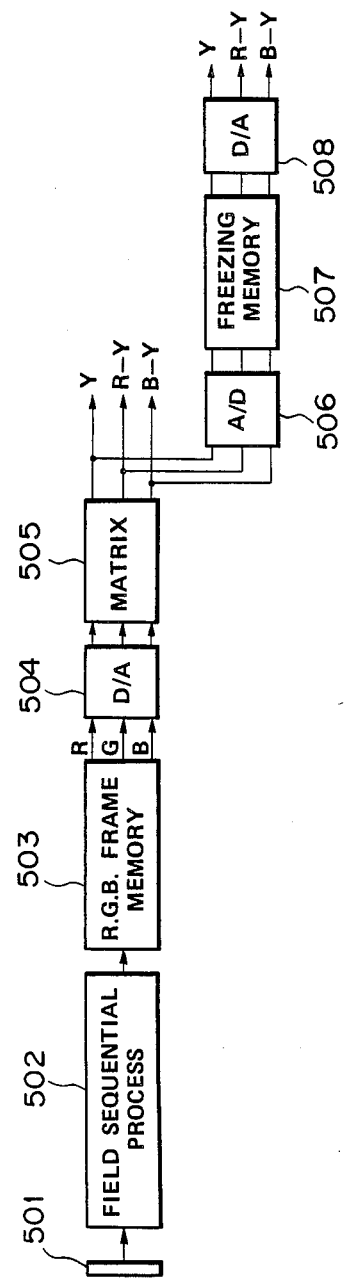

First, the summary of the video signal processing apparatus in and after the eleventh embodiment shall be explained by using FIG. 32.

This video signal processing apparatus comprises a field sequential type process circuit 502 processing so as to be a video signal the output signal of an imaging means such as a solid state imaging device 502 by the field sequential type, a first memory means of R, G and B frame memories storing the output signal of this process circuit 502, a second memory means of a freezing memory 507 connected in series with this first memory means, for example, through a D/A converter 504, matrix circuit 505 and A/D converter 506, a first output means whereby the video signal from the first memory means such as the above mentioned R, G and B frame memories 503 is converted to a video signal, for example, by the above mentioned D/A converter 504 and matrix circuit 505 and the video signal can be output and a second output means whereby the video signal from the second memory means such as the above mentioned freezing memory 507 can be output, for example, through a D/A converter 508.

According to this video signal processing apparatus, even in case a picture image is frozen by using the second memory means and a stationary picture is displayed by the picture image signal from the second output means, a moving picture or a stationary picture different from the frozen stationary picture can be displayed.

The eleventh embodiment shall be concretely explained in the following by using FIGS. 33 to 37.

Figure 34:
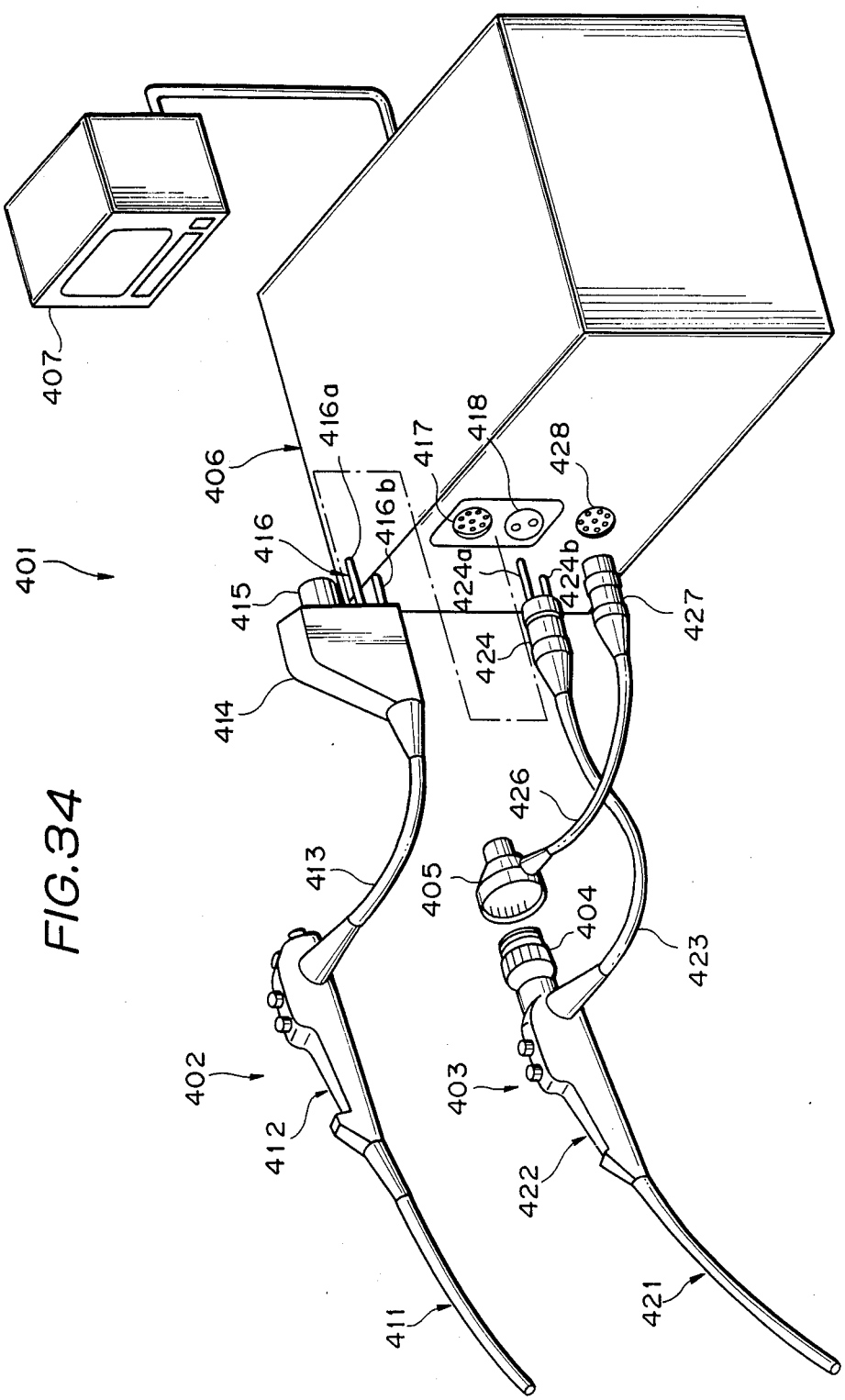
Figure 35:
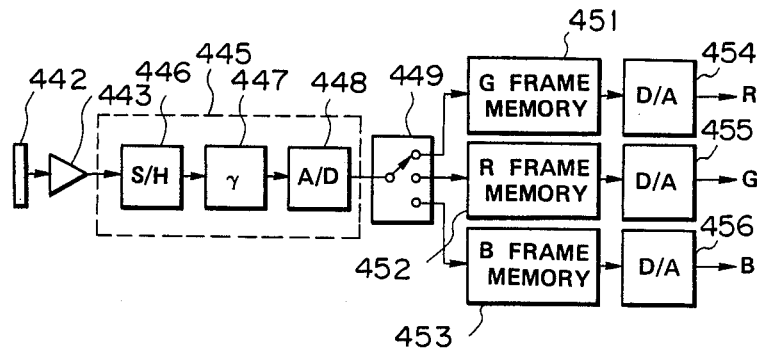
Figure 36:
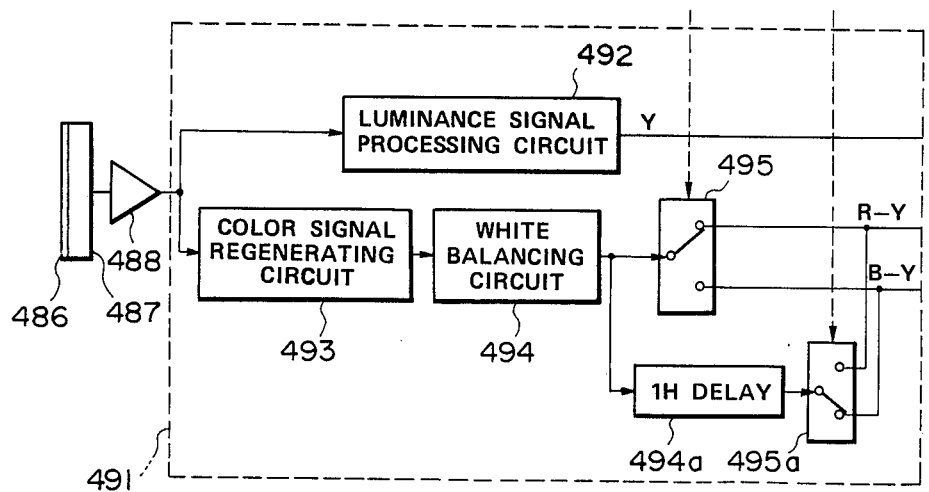

As shown in FIG. 34, an endoscope apparatus 401 comprises a field sequential type electronic endoscope 402, a fiber scope 403 having an image transmitting means such as an image guide consisting of a fiber bundle, a removably connected synchronous type television camera 405, a control apparatus 406 in which a light source apparatus and video image signal processing circuit are contained and to which the above mentioned electronic endoscope 402, fiber scope 403 and television camera 405 are to be connected and a displaying means such as a color CRT monitor 407 connected to this control apparatus 406.

In the above mentioned electronic endoscope 402, a thick operating part 412 is connected to the rear end of an elongate, for example, flexible insertable part 411. A flexible cable 413 is extended sidewise from the rear end of the above mentioned operating part 412 and is provided at the tip with a connector 414. An electric system socket 415 and illuminating system socket 416 are integrally provided in this connector 414. The above mentioned illuminating system socket 416 is provided with an illuminating system terminal 416a and an air and water feeding system terminal 416b communicating with an air and water feeding channel not illustrated provided within the above mentioned insertable part 411. A field sequential type electric system connector receptacle 417 and illuminating system connector receptacle 418 to which the above mentioned electric system socket 415 and illuminating system socket 416 are to be respectively connected are provided, for example, on the front surface of the above mentioned control apparatus 6 so that the above mentioned electronic endoscope 402 may be connected to the control apparatus 406 by these sockets 415 and 416 and connector receptacle, 417 and 418.

Not only the field sequential type electronic endoscope 2 but also the field sequential type television camera can be connected to the above mentioned field sequential type electric system connector receptacle 417.

On the other hand, in the above mentioned fiber scope 403, the same as in the above mentioned electronic endoscope 402, a thick operating part 422 is connected to the rear end of an elongate, for example, flexible insertable part 421. A flexible cable 423 is extended sidewise from the rear end of the above mentioned operating part 422 and is provided at the tip with an illuminating system connector 424. The above mentioned illuminating system connector 424 is provided with an illuminating system terminal 424a and an air and water feeding system terminal 424b communicating with an air and water feeding channel not illustrated provided within the above mentioned insertable part 421. The above mentioned illuminating system connector 424 is to be connected to the above mentioned illuminating system connector receptacle 418. The above mentioned illuminating system connector 424 can be connected not only to the illuminating system connector receptacle 418 but also to various light source apparatus for light guide system endoscopes.

A flexible cable 426 is extended sidewise from the above mentioned television camera 405 and is provided at the tip with an electric system connector 427. This electric system connector 427 is to be connected to a synchronous type electric system connector receptacle 428 provided adjacently below the above mentioned illuminating system connector receptacle 418, for example, on the front surface of the above mentioned control apparatus 406.

Not only the above mentioned fiber scope 403 and television camera 405 but also a synchronous electronic endoscope having a synchronous type solid state imaging device in the tip part of the insertable part can be connected to the above mentioned illuminating system connector receptacle 418 and synchronous type electric system connector receptacle 428.

Figure 33:
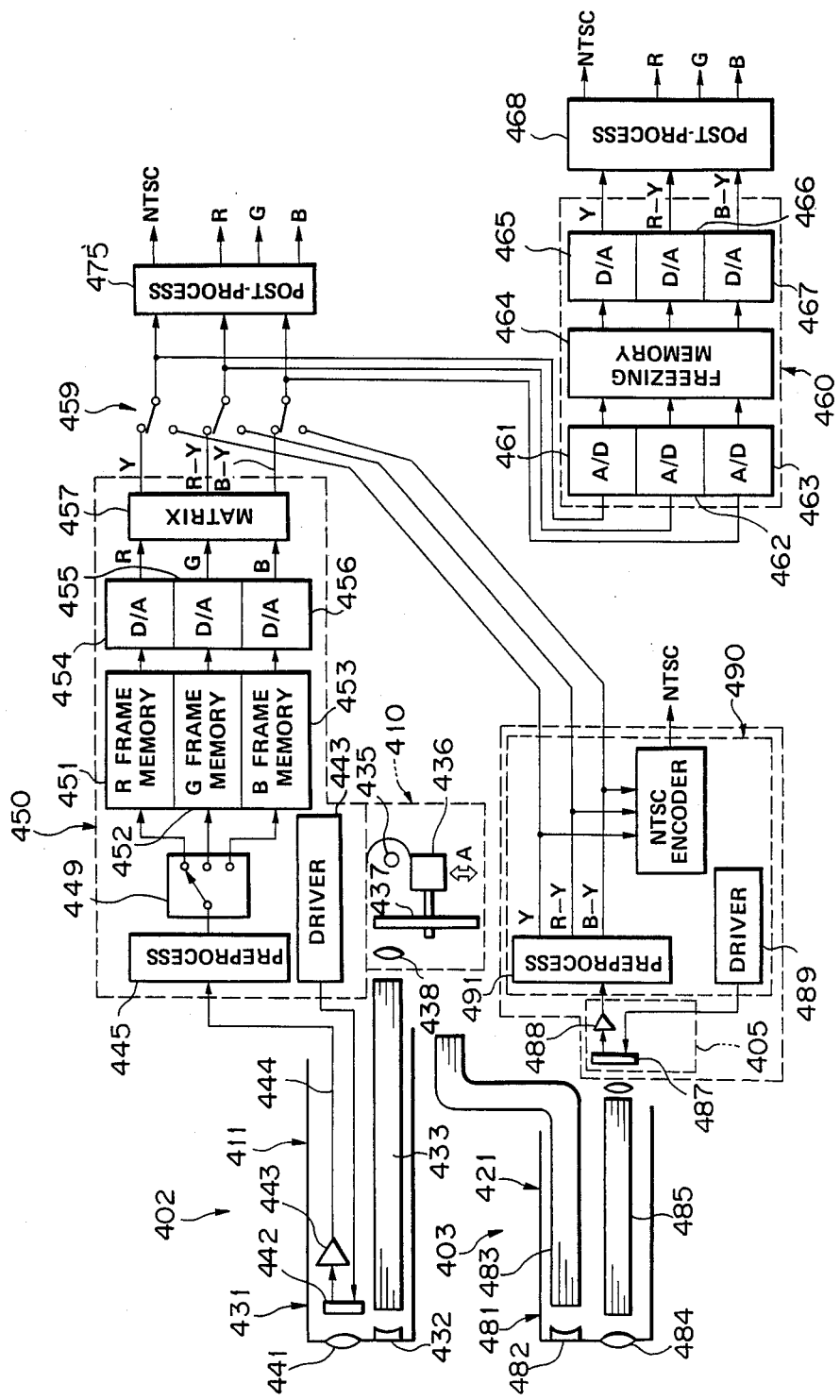

As shown in FIG. 33, a light distributing lens 432 is arranged in the tip part 431 of the insertable part 411 of the above mentioned electronic endoscope 402. A light guide 433 consisting of a flexible fiber bundle inserted through the above mentioned insertable part 411 is arranged at the exit end on the rear end side of this light distributing lens 432 and is connected at the base end to the above mentioned illuminating system socket 416. When tire connector 414 is connected to the connector receptacles 417 and 418 of the control apparatus 406, the illuminating light emitted from the light source apparatus 410 within the control apparatus 406 will enter the above mentioned light guide 433. The above mentioned light source apparatus 410 is provided with a lamp 435 emitting a white light and a rotary color filter 437 having red (R), green (G) and blue (B) three primary color transmitting filters and rotated by a motor 436. The illuminating light emitted from the above mentioned lamp 435 is made lights of the respective wavelengths of red, green and blue sequentially through the above mentioned rotary color filter, is condensed by a condenser lens 433 and enters the above mentioned light guide 433. This embodiment, the above mentioned rotary color filter 437 can move in the direction indicated by the arrow A and can be removably inserted between the above mentioned lamp 435 and condenser lens 458. The light incident upon the above mentioned light guide 433 is led to the above mentioned tip part 431 by this light guide 433, is emitted out of the exit end of this light guide 433 and is radiated onto an object through the above mentioned light distributing lens 432.

An image forming optical system 441 consisting of an objective or the like is provided in the tip part 431 of the above mentioned electronic endoscope 402 and a solid state imaging device 443 (502 in FIG. 32) such as a CCD as an imaging means by the field sequential type is arranged in the image forming position of this image forming optical system 441. This solid state imaging device 442 is driven by a field sequential type driver 443 within the above mentioned control apparatus 406. The returning light in response to the respective color lights of red, green and blue from the above mentioned object is received by the above mentioned solid state imaging device 442 through the above mentioned image forming optical system 441 the output signal of this solid state imaging device 442 is amplified by a pre-amplifier 443 provided within the above mentioned tip part 431 and is input into a field sequential type video signal processing part 450 within the control apparatus 406 through a signal line 444 inserted through the insertable part 411 and cable 413, the electric system socket 415 of the above mentioned connector 414 and the field sequential type electric system connector receptacle 417. In this video signal processing part 450, the output signal of the above mentioned solid state imaging device 442 is first input into such pre-process circuit 445 (corresponding to the field sequential type process circuit 502 in FIG. 32) as is shown, for example, in FIG. 35. In this preprocess circuit 445, a video signal is extracted from the output signal of the above mentioned solid state imaging device 442 in a sample holding circuit 446, is γ-corrected in the γ-correcting circuit 447 and is then converted to a digital signal by an A/D converter 448. This digital signal is switched as synchronized with the illumination in the color field sequence by a multiplexer 449 and is stored in an R frame memory 451, G frame memory 452 and B frame memory 453 (503 in FIG. 32) as a first memory means corresponding to the respective colors of red, green and blue sequentially. The signals of these frame memories 451, 452 and 453 are read out simultaneously at a velocity matching such displaying apparatus as a color CRT monitor 407 and are converted to analogue signals respectively by the D/A converters 454, 455 and 456 (504 in FIG. 32) to produce R, G and B color signals which are converted to a luminance signal Y and color difference signals R-Y and B-Y by a matrix circuit 457 (505 in FIG. 32).

This embodiment, the picture image can be frozen by utilizing the above mentioned R, G and B frame memories 451, 452 and 453. That is to say, in freezing, the data for one frame is stored respectively in the above mentioned R, G and B frame memories 451, 452 and 453 and then writing into the above mentioned R, G and B frame memories 451, 452 and 453 is stopped.

The respective output ends of the luminance signal Y and color difference signals R-Y and B-Y of the above mentioned matrix circuit 457 are connected to the switching contacts on one side of a switching switch 459 so that the above mentioned luminance signal Y and color difference signals R-Y and B-Y may be input into a freezing part 460 through this switching switch 459. In this freezing part 460, the above mentioned luminance signal Y and color difference signals R-Y and B-Y are converted to digital signals respectively by A/D converters 461, 462 and 463 (506 in FIG. 32) and are then stored in a freezing memory 464 (507 in FIG. 32) as a second memory means. The digital signals read out of this freezing memory 464 are converted to analogue signals respectively by D/A. converters 465, 466 and 467 (508 in FIG. 32) and are input into a post-process circuit 468 as such second output means as is shown, for example, in FIG. 37. In this post-process circuit 468, the luminance signal Y and color difference signals R-Y and B-Y are input into an NTSC encoder 469, are converted to NTSC signals and are output. The above mentioned luminance signal Y and color difference signals R-Y and B-Y are input also into an inverse matrix circuit 470, are converted to R, G and B signals by this inverse matrix circuit 470 and are output through drivers 471, 472 and 473. Thus, in this embodiment, the NTSC signal and R, G and B signals can be output. The above mentioned NTSC signal or R, G and B signals are input into the monitor 407 in which the observed image is displayed.

The above mentioned freezing part 460, in freezing, data for 1 frame is stored in the above mentioned freezing memory 464, then writing into the above mentioned freezing memory 464 is stopped and a stationary picture can be displayed in the monitor 407.

In the above mentioned post-process circuit 468, as required, a picture quality adjusting means such as an outline enhancing circuit and tone controlling circuit not illustrated are provided.

In this embodiment, the luminance signal Y and color difference signals R-Y and B-Y of the above mentioned matrix circuit 457 are input also into a post-process circuit 475 as the same first output means as the above mentioned post-process circuit 468 through the above mentioned switching switch 459. The NTSC signal and R, G and B signals not passing through the above mentioned freezing part 460 can be output from this post-process circuit 475.

On the other hand, a light distributing lens 482 is arranged in the tip part 481 of the insertable part 431 of the above mentioned fiber scope 403. A light guide 483 consisting of a flexible fiber bundle inserted through the above mentioned insertable part 421 is arranged at the exit end on the rear end side of this light distributing lens 42. This light guide 483 is connected at the base end to the above mentioned illuminating system connector 424. The illuminating light emitted from the light source apparatus 410 within the above mentioned control apparatus 406 enters the above mentioned light guide 483. In case the illuminating system connector 424 of this fiber scope 403 is connected to the illuminating system connector receptacle 418 of the above mentioned control apparatus 406, the rotary color filter 437 of the light source apparatus 410 will be moved in the direction indicated by the arrow A and the white illuminating light emitted from the lamp 435 will enter the above mentioned light guide 483 without passing through the above mentioned rotary color filter 437. The light having entered the above mentioned light guide 483 is led to the above mentioned tip part 81 by this light guide 483, is emitted from the exit end of this light guide 483 and is radiated onto an object through the above mentioned light distributing lens 482.

An image forming optical system 48 consisting of an objective or the like is provided in the tip part 481 of the above mentioned fiber scope 403. The tip surface of an image guide 485 consisting of a fiber bundle inserted through the insertable part 421 is arranged in the image forming position of this image forming optical system. The observed image formed by the above mentioned image forming optical system 484 is led to the eyepiece part 404 by the above mentioned image guide 485 and can be observed with this eyepiece part 404. The above mentioned observed image can be imaged by connecting the television camera 405 to this eyepiece part 404.

The above mentioned television camera 405 is provided with a solid state imaging device 487 arranged in the image forming position of the above mentioned eyepiece part 404 and a pre-amplifier 488 amplifying the output signal of this solid state imaging device 487. A filter array in which color filters transmitting respectively color lights such as of R, G and B are arranged in the form of a mosaic is provided on the front surface of the above mentioned solid state imaging device 487 which is driven by a synchronous type driver 489 within the control apparatus 406. The output signal of the above mentioned solid state imaging device 487 is amplified by the above mentioned pre-amplifier 488 and is input into a synchronous type video signal processing part 490 within the control apparatus 406 through the signal line inserted through the cable 426, electric system connector 427 and synchronous type electric system connector receptacle 428. In this vide signal processing part 4990, the output signal of the above mentioned solid state imaging device 487 is first input into a pre-process circuit 491 such as is shown, for example, in FIG. 36. In this pre-process circuit 491, the output signal of the above mentioned solid state imaging device 487 is input into a luminance signal processing circuit 492 to produce a luminance signal Y. The output signal of the above mentioned solid state imaging device 487 is input also into a color signal reproducing circuit 493 to produce in time series color difference signals R-Y and B-Y for 1 horizontal line, is white balance-compensated in a white balance circuit 494, is, on one hand, input directly into an analogue switch 495 and is, on the other hand, delayed by 1 horizontal line in a 1H delay line 491a and input into an analogue switch 495a to obtain color difference signals R-Y and B-Y.

The luminance signal Y and color difference signal R-Y and B-Y produced by this pre-process circuit 491 are input into an NTSC encoder 496 to be converted to an NTSC signal to be output. The respective output ends of the above mentioned luminance signal Y and color difference signals R-Y and B-Y of the above mentioned pre-process circuit 491 are connected to the other switching contacts of the above mentioned switching switch 459. The above mentioned luminance signal Y and color difference signals R-Y and B-Y are input into the above mentioned freezing part 460 and post-process circuit 475 through this switching switch 459. That is to say, in this embodiment, the above mentioned freezing part 460, a post-process part 468 which is an output means of this freezing part 460 and the post-process circuit 475 are used in common with the field sequential type electronic endoscope 402 and synchronous type television camera 405. Therefore, by switching the above mentioned switching switch 459, the video signal of the observed image imaged by the above mentioned electronic endoscope 402 and the video signal of the observed image imaged by the above mentioned fiber scope 403 and television camera 405 are switched and output from the above mentioned post-process circuits 468 and 475.

In this embodiment formed as in the above, the R, G and B frame memories 451, 452 and 453 as the first memory means are provided in the rear of the field sequential type pre-process circuit 445 and the freezing memory 464 as the second memory means is provided in series in the rear of these R, G and B frame memories 451, 452 and 453. The NTSC signal and R, G and B signals not frozen by the above mentioned freezing memory 464 are output from the post-process circuit 475 connected to the switching switch 459. The NTSC signal and R, G and B signals freezable by the above mentioned freezing memory 464 are output from the post-process circuit 468 in the rear of the freezing part 460.

Therefore, even in case the picture image is frozen by the above mentioned freezing memory 464, when the output from the above mentioned post-process circuit 475 is input into the monitor, a moving picture will be able to be displayed. Thus, the stationary picture and moving picture can be simultaneously displayed by switching the switching switch 459 even when either of the field sequential type electronic endoscope 402 and synchronous type television camera 405 is used.

Further, in case the field sequential type electronic endoscope 402 is used, when the picture image is frozen by the above mentioned freezing memory 464 and is then frozen by the R, G and B frame memories 451, 452 and 453, a stationary picture different from the frozen stationary picture displayed by the output from the post-process circuit 468 can be displayed.

When the output from the post-process circuit 468 and the output from the post-process circuit 475 are switched and are input into the same monitor 407, the stationary picture and moving picture can be switched and displayed.

In this embodiment, the freezing part 460 and post-process circuits 468 and 475 are in common with the field sequential type and synchronous type. Therefore, the same as in the first embodiment, as compared with the case that two sets are provided independently for the respective imaging systems, the number of parts can be made smaller, the cost can be made lower and the circuit formation can be made simpler. As the output end is in common with the field sequential type and synchronous type, the connection of the monitor 407 need not be changed in response to the imaging system.

FIG. 38 shows the twelfth embodiment of the present invention.

In this embodiment, the output from the switching switch 559 and the output through the freezing memory 507 are mixed in the post-process circuit 468 and are displayed in the same monitor.

For example, when the outputs of the R, G and B frame memory 503 are read out at intervals of 1 line and 1 pixel and are mixed with the outputs having passed through the above mentioned freezing memory 507 in the above mentioned post-process circuit 468 a stationary picture can be displayed on a large picture surface 511 and a moving picture can be displayed on a small picture surface 512 in the monitor 407. By switching the switching switch 459, displaying is possible when using either of the field sequential type electronic endoscope 402 and synchronous type television camera 405. In the case of using the field sequential type electronic endoscope 402, when a picture image is frozen by the above mentioned freezing memory 507 and then a picture image is frozen by the R, G, B frame memory 503, a stationary picture different from the stationary picture displayed on the large picture surface 511 can be displayed on the small picture surface 512.

FIG. 39 shows the thirteenth embodiment of the present invention.

In this embodiment, the output of the post-process circuit 468m is input into the (main) monitor 407, the output from the switching switch 459 is input into an NTSC encoder 513 and the NTSC output from this NTSC encoder 513 is input into a small sub-monitor 514.

According to this embodiment, in the above mentioned monitor 407, at the normal time, a moving picture will be displayed and, at the time of freezing by the freezing memory 507, a stationary picture will be displayed and, in the above mentioned sub-monitor 514, a moving picture will be displayed. In the case of using the field sequential type electronic endoscope 402, when a picture image is frozen by the above mentioned freezing memory 507 and then a picture image is frozen by the R, G, B frame memory 503, a stationary picture different from the stationary picture displayed in the monitor 407 can be displayed in the sub-monitor 514.

Figure 40:
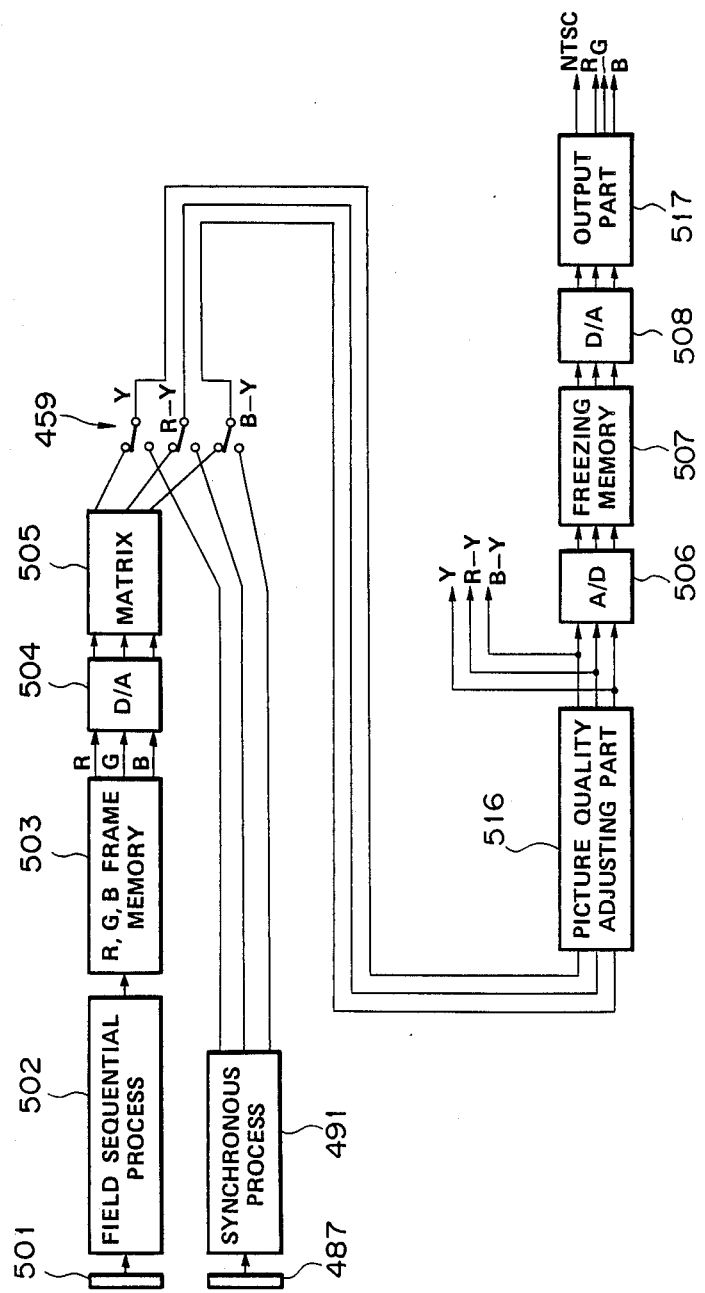
FIG. 40 is a block diagram showing the formation of an endoscope apparatus relating to the fourteenth embodiment of the present invention.

FIG. 40 shows the fourteenth embodiment of the present invention.

In this embodiment, such picture quality adjusting part 516 as of the outline enhancing circuit and tone controlling circuit provided within the post-process circuit 468 in the eleventh embodiment is provided before the freezing memory 507 and A/D converter 506 so that the output of this picture quality adjusting part 516 may be taken out. In the drawing, the output part 517 is the same as of the post-process circuit 468 in which a picture quality adjusting part such as of the above mentioned outline enhancing circuit and tone control circuit is not provided.

According to this embodiment, both of the stationary picture and moving picture can be adjusted in the quality by the above mentioned picture quality adjusting part 516.

Figure 41:
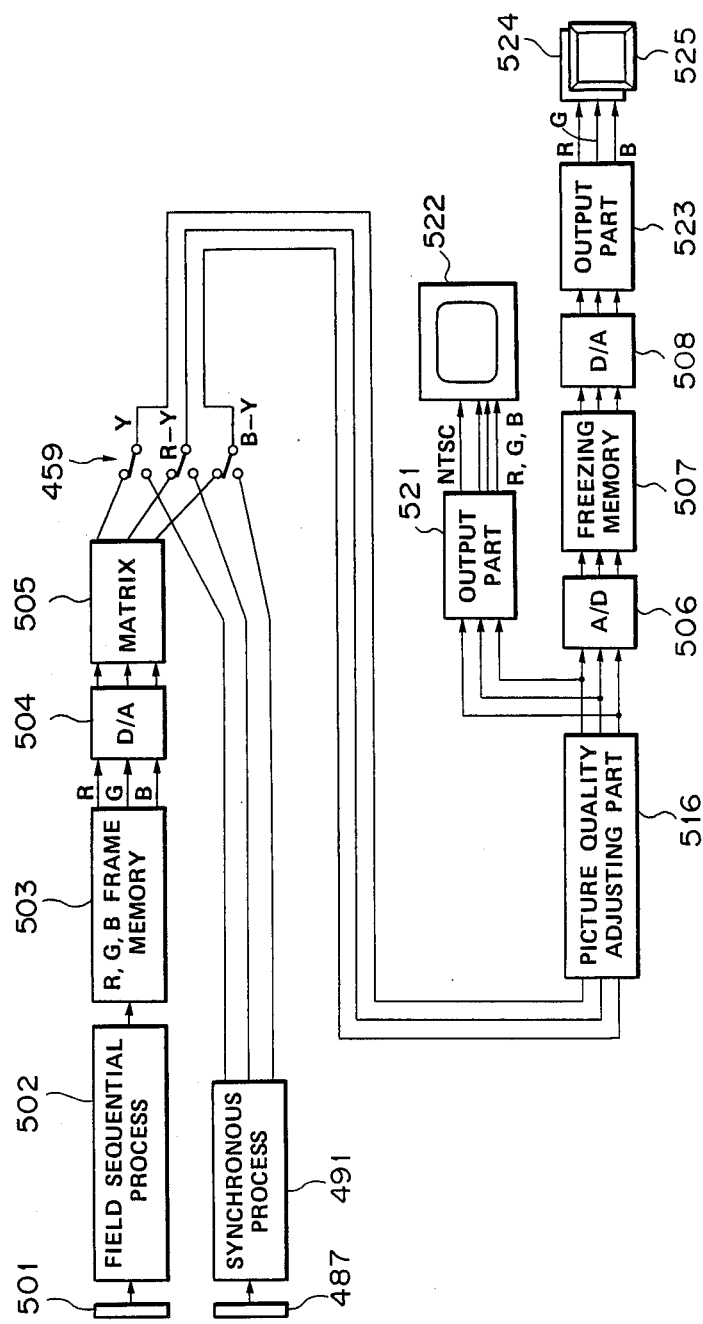
FIG. 41 is a block diagram showing the formation of an endoscope apparatus relating to the fifteenth embodiment of the present invention.

FIG. 41 shows the fifteenth embodiment of the present invention.

In this embodiment, the output of the picture quality adjusting part 516 in the above mentioned fourteenth embodiment is input into an observing monitor 522 through a first output part 521 and the output from the freezing memory 507 is input into a photographing monitor 523 through a second output part 523. The above mentioned photographing monitor 523 is fitted with a camera 525 so that the picture surface of this monitor 524 may be photographed.

In this embodiment, in photographing, the picture image is frozen by the above mentioned freezing memory and the stationary picture displayed in the above mentioned photographing monitor 524 is photographed with the camera 525. During this photographing, a moving picture is displayed in the observing monitor 522. In case a stationary picture is also to be displayed on the observing monitor 522 is confirm a color split or the like, first the R, G, B frame memory 503 is frozen and them immediately the freezing memory 507 may be frozen.

A picture quality adjusting part exclusively for the monitor 524 may be provided in the above mentioned second output part 523 so that an adjustment or the like may be made in conformity with the film of the camera 525.

Figure 42:
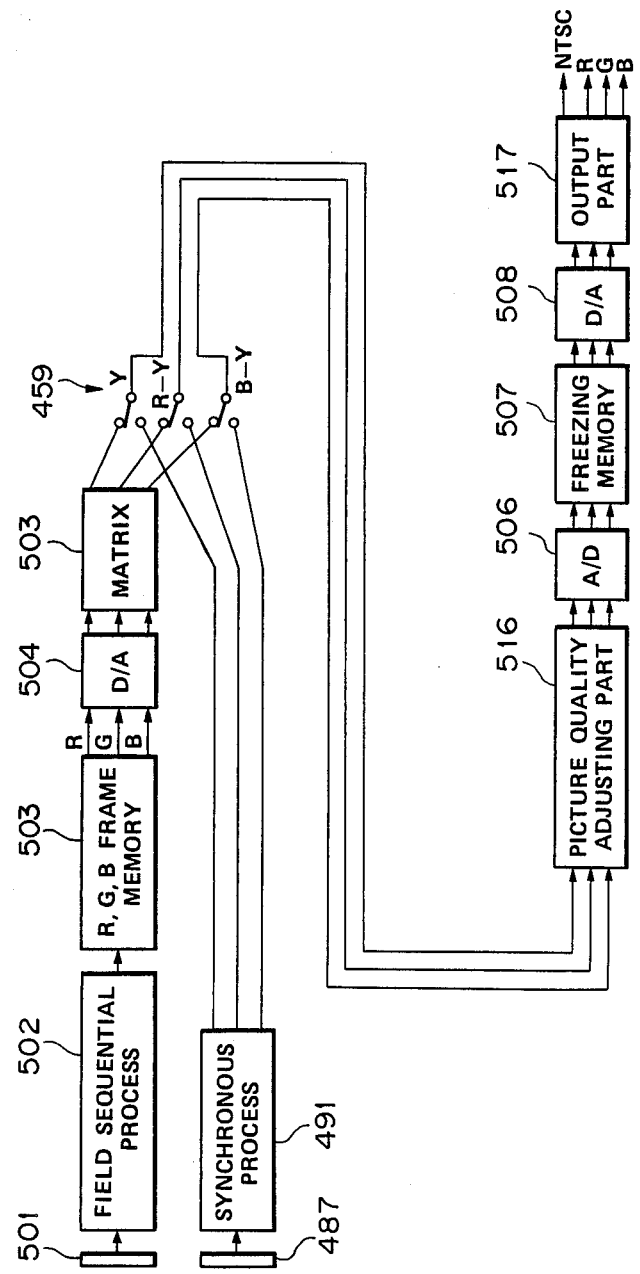
FIG. 42 is a block diagram showing the formation of an endoscope apparatus relating to the sixteenth embodiment of the present invention.

FIG. 42 shows the sixteenth embodiment of the present invention.

In this embodiment, a first stationary picture is frozen by the freezing memory 507, while this first stationary picture is being, for example, photographed, a second stationary picture is frozen by the R, G, B frame memory 503 and, after the photographing of the first stationary picture ends, the second stationary picture stored in the above mentioned R, G, B frame memory 503 is fed to the above mentioned freezing memory 507 and can be photographed.

In photographing, conventionally, due to the film rewinding time or the like, after the first photographing, the stationary picture just after the first photograph could not be photographed. According to this embodiment, up to two photographs can be photographed at the intervals of a very short time.

Figure 43:
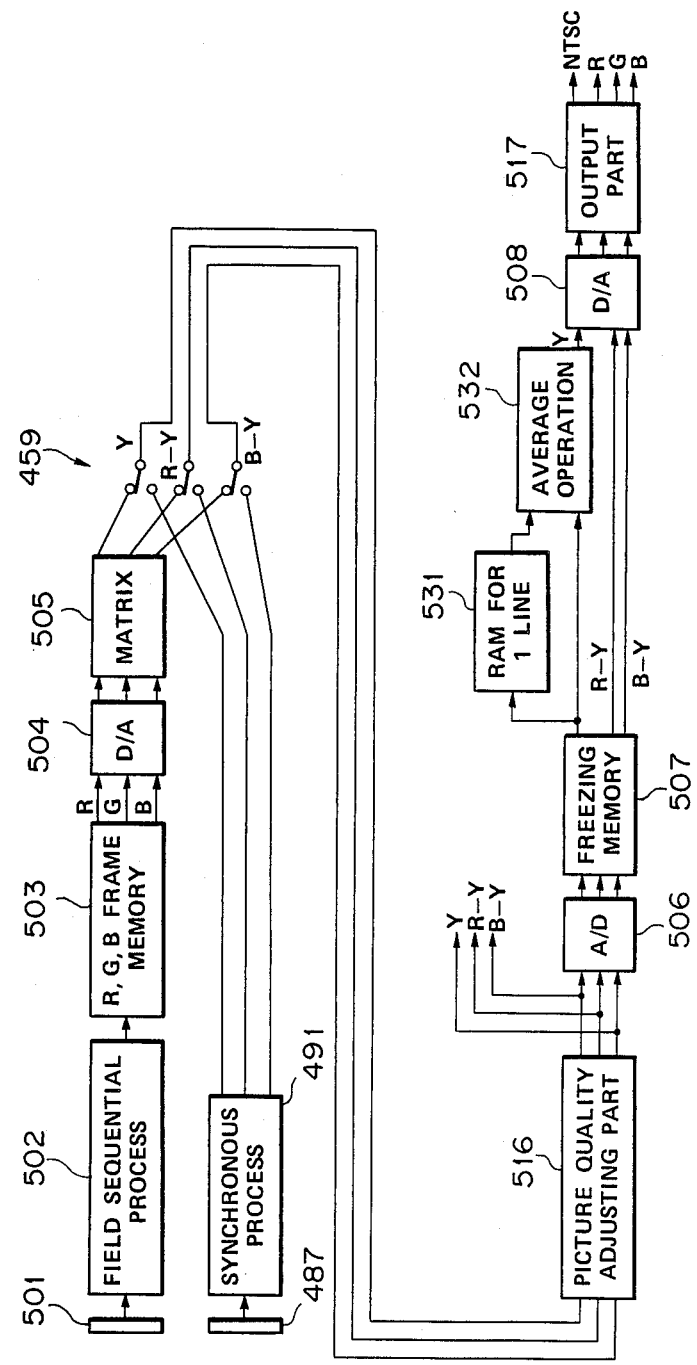
FIG. 43 is a block diagram showing the formation of an endoscope apparatus relating to the seventeenth embodiment of the present invention.

FIG. 43 shows the seventeenth embodiment of the present invention.

In this embodiment, a line interpolating circuit is provided between the freezing memory 507 and D/A converter 508 to improve the resolution in case the number of pixels of the solid state imaging device 502 is small or the like. That is to say, a RAM 531 stored by 1 line the luminance signal Y from the above mentioned freezing memory 507 is provided, the average between the data stored in this RAM 531 and the data of the next 1 line is operated by an average operating circuit 532 so that a line interpolation may be made.

Conventionally, the line interpolating process has been made by an analogue signal. In this embodiment, the line interpolation can be processed by the digital signal from the above mentioned freezing memory 507 and therefore the line can be interpolated positively and simply.

In the eleventh to seventeenth embodiments, the field sequential type imaging means may be a field sequential type television camera connected to the eyepiece part 404 of the fiber scope 403.

The field sequential type and synchronous type video signal processing circuits may be not only those used partly in common as in the above mentioned respective embodiments but also those provided separately and may be only a video signal processing circuit corresponding to the field sequential type.

Further, not only the monitor 407 but also a picture image file and video tape recorder may be connected to the control apparatus 406.

Thus, according to the eleventh to seventeenth embodiments, the picture image signal from the first memory means storing the output signal of the process circuit and the picture image signal form the second memory means connected in series with the above mentioned first memory means can be output. Therefore, there is an effect that, even in freezing, a moving picture or a stationary picture from the stationary picture in freezing can be displayed.

The present invention is not limited to the above mentioned respective embodiments, for example, to those made integral with the light source apparatus or used as combined with the light source apparatus but may be used independently.

In this invention, it is apparent that working modes different in a wide range can be formed on the basis of this invention without departing from the spirit and scope of the invention. This invention is not restricted by its specific working modes except being limited by the appended claims.

What is claimed is:

1. An endoscope signal processing apparatus to which an endoscope provided with a field sequential type color imaging means and an endoscope provided with a synchronous type color imaging means can be commonly connected, said endoscope signal processing apparatus comprising:
   a first processing means for processing a signal for said field sequential type color imaging means; and
   a second signal processing means for processing a signal for said synchronous type color imaging means.

2. An endoscope signal processing apparatus according to claim 1 further comprising a light source apparatus outputting an illuminating light, to said field sequential type color imaging means and a white light.

3. An endoscope signal processing apparatus according to claim 1 wherein said first signal processing means and second signal processing means have a common video signal output end.

4. An endoscope signal processing apparatus according to claim 1 provided with a signal input end common to the field sequential type color imaging means and the synchronous type color imaging means.

5. An endoscope signal processing apparatus according to claim 3 further comprising a discriminating means for discriminating an imaging system of an endoscope to be connected and an output switching means wherein a video signal transmitted through a video signal processing means corresponding to the imaging system discriminated by said discriminating means is led selectively to said common video signal output end.

6. An endoscope signal processing apparatus according to claim 3 further comprising a light modulator converting a video signal from both signal processing means to a light signal and an output end outputting modulated light modulated by said light modulator.

7. An endoscope signal processing apparatus according to claim 4 further comprising a discriminating means for discriminating an imaging system of an endoscope to be connected and an input switching means wherein a signal from said common signal input end is led selectively to a signal processing means corresponding to the imaging system discriminated by said discriminating means.

8. An endoscope signal processing apparatus according to claim 5 or 7 wherein said discriminating means has a comparing means for determining the imaging system by a characteristic of an output signal of the imaging means which is different depending on the imaging system.

9. An endoscope signal processing apparatus according to claim 1 wherein one signal processing means having a circuit partly used in common with the other signal processing means.

10. An endoscope signal processing apparatus to which an endoscope provided with a field sequential type color imaging means and an endoscope provided with a synchronous type color imaging means can be connected, said endoscope signal processing apparatus comprising:
    a first signal processing means for processing a signal for said field sequential type color imaging means; and
    a second signal processing for processing a signal for said sequential type color imaging means,
    said first signal processing means having a circuit partly used in common with said second signal processing means.

11. An endoscope signal processing apparatus according to claim 10 wherein said second signal processing means is separable from said first signal processing means.

12. An endoscope signal processing apparatus according to claim 9 or 10 wherein said first signal processing means has a process circuit producing R, G and B three primary color signals from a picture image information signal from said field sequential type imaging means.

13. An endoscope signal processing apparatus according to claim 9 or 10 wherein said second signal processing means has a process circuit producing a luminance signal and color difference signals from a picture image information signal from said synchronous imaging means.

14. An endoscope signal processing apparatus according to claim 9 or 10 wherein said circuit used in common is an outline enhancing circuit.

15. An endoscope signal processing apparatus according to claim 14 wherein said first signal processing means has a process circuit producing R, G, B three primary color signals from a picture image information signal from said field sequential type imaging means and a matrix circuit converting the three primary color signals from said process circuit to a luminance signal and color difference signals; said second signal processing means has a process circuit producing a luminance signal and color difference signals from a picture image information signal from said synchronous type imaging means; a selecting means selecting a luminance signal and color difference signals from one of said signal processing means is further provided; and the luminance signal from said selecting means is input into said outline enhancing circuit.

16. An endoscope signal processing apparatus according to claim 9 or 10 wherein said first signal processing means and second signal processing means have a common video signal output end.

17. An endoscope signal processing apparatus according to claim 9 or 10 further comprising a bypass circuit which bypasses said commonly used circuit.

18. An endoscope signal processing apparatus according to claim 9 or 10 wherein a common signal input end is provided for said field sequential type color imaging means and said synchronous type color imaging means.

19. An endoscope signal processing apparatus according to claim 18 further comprising an input switching means for leading a signal from said common signal input end selectively to said first signal processing means and said second signal processing means.

20. An endoscope signal processing apparatus according to claim 19 further comprising a discriminating means for discrimination an imaging system of an endoscope to be connected, said switching means selecting the signal processing means for an imaging means of the endoscope to be used based upon a discriminating output of said discriminating means.

21. An endoscope signal processing apparatus according to claim 9 or 10 wherein said first signal processing means has a first memory means for storing a video signal.

22. An endoscope signal processing apparatus according to claim 20 wherein said commonly used circuit is a second memory means for inputting a video signal from said first memory means and for storing said video signal.

23. An endoscope signal processing apparatus according to claim 22 further comprising a picture quality adjusting means between said first memory means and said second memory means.

24. An endoscope signal processing apparatus according to claim 22 further comprising a line interpolating means in rear part of said second memory means.

25. An endoscope signal processing apparatus according to claim 22 further comprising a first output means for outputting the video signal from said first memory means and a second output means for outputting a video signal from said second memory means.

26. An endoscope signal processing apparatus according to claim 25 wherein said first memory means consists of a plurality of frame memories respectively storing signals imaged in response to respective illuminating lights of field sequential type.

27. An endoscope signal processing apparatus according to claim 26 further comprising a mixing means for mixing the video signal from said first output means and the video signal from said second output means and for displaying on one monitor an image by the video signal from said first output means and an image by the video signal from said second output means.

28. An endoscope signal processing apparatus according to claim 26 further comprising a picture quality adjusting means between said first memory means and said first output means and second memory means.

29. An endoscope system comprising:
a first endoscope comprising an elongate insertable part having an observing window in a tip part and a first imaging means for receiving and for color-imaging in a field sequential type a light from an object incident from said observing window;
a second endoscope comprising an elongate insertable part having an observing window in a tip part and a second imaging means for receiving and for color-imaging in a synchronous type a light from an object incident from said observing window;
an illuminating means for feeding illuminating light to said first endoscope and said second endoscope;
a signal processing apparatus having a first signal processing means for processing a signal for said first endoscope and a second signal processing means for processing a signal for said second endoscope; and
a color monitor inputting video signals from said respective signal processing means and color-displaying an object image,
one signal processing means having a circuit partly used in common with the other signal processing means.

30. An endoscope system comprising:
a first endoscope comprising an elongate insertable part having an observing window in a tip part and a first imaging means for receiving and for color-imaging in a field sequential type a light from an object incident from said observing window;
a second endoscope comprising an elongate insertable part having an observing window in a tip part and a second imaging means for receiving and for color-imaging in a synchronous type a light from an object incident from said observing window;
an illuminating means for feeding illuminating light to said first endoscope and said second endoscope;
a first signal processing means for processing a signal for said first endoscope;
a second signal processing means for processing a signal for said second endoscope;
a color monitor inputting video signals from said respective signal processing means and color-displaying an object image,
said first signal processing means and said second signal processing means having a common video signal output end.

31. An endoscope system according to claim 30 further comprising a discriminating means for discriminating an imaging system of an endoscope to be connected and an output switching means wherein a video signal transmitted through a video signal processing means corresponding to the imaging system discriminated by said discriminating means is led selectively to said common video signal output end.

32. An endoscope system according to claim 31 wherein said discriminating means has a comparing means for determining the imaging system by a characteristic of an output signal of an imaging means which is different depending on the imaging system.

33. An endoscope system according to claim 31 wherein a light source apparatus having said illuminating means and connected with said first signal processing means only when said first endoscope is used and said discriminating means has a connection sensing means for discriminating the imaging system of the endoscope to be used by sensing whether said light source apparatus and said first signal processing means are connected with each other or not.

34. An endoscope system according to claim 31 wherein said first endoscope and said second endoscope have respectively discriminating information generating means for generating information showing the imaging system and said discriminating means inputs information generated by said discriminating information generating means to discriminate the imaging system.

35. An endoscope system according to claim 34 wherein said discriminating information generating means has two terminals, each terminal has a different resistance depending on the imaging system and said discriminating means has a sensing means for sensing a resistance value between the two terminals of said discriminating information generating means.

36. An endoscope system according to claim 34 wherein said discriminating information generating means has a discriminating part provided in a connector part connected to said first and second signal processing means which is different in form depending on the imaging system and said discriminating means has a sensing means for sensing a difference of the form of said discriminating part.

37. An endoscope system according to claim 36 wherein said sensing means has a light emitting means, a light receiving means opposed to said light emitting means with said discriminating part held therebetween and a light amount sensing means for sensing a received light amount of said light receiving means.

38. An endoscope signal processing apparatus to which an endoscope, provided with one of a field sequential type color imaging means and a synchronous type color imaging means, can be connected, said endoscope signal processing apparatus comprising:
at least a signal processing means for processing a signal for said one of said color imaging means, said signal processing means being provided within an integral apparatus; and
said signal processing means having a circuit sued partly in common with the other color signal processing means processing a signal for the other color imaging means.

39. An endoscope signal processing apparatus according to claim 38 wherein said signal processing means processes the signal for the field sequential type color imaging means.

40. An endoscope signal processing apparatus according to claim 39 wherein said signal processing means has a processing circuit producing three primary color signals of R, G and B from a picture image information signal from the field sequential type imaging means.

41. An endoscope signal processing apparatus according to claim 38 wherein said signal processing means processes the signal for the synchronous type color imaging means.

42. An endoscope signal processing apparatus according to claim 41 wherein said signal processing means has a processing circuit producing a luminance signal and color difference signals from a picture image information signal from the synchronous type color imaging means.

43. An endoscope signal processing apparatus according to claim 38 wherein said commonly used circuit is an outline enhancing circuit.

44. An endoscope signal processing apparatus according to claim 38 wherein said signal processing means has a video signal output end usable in common with the other color signal processing means.

45. An endoscope signal processing apparatus according to claim 38 further comprising a bypass circuit which bypasses said commonly used circuit.

46. An endoscope signal processing apparatus according to claim 38 further comprising a light source apparatus which can output an illuminating light to the field sequential type color imaging means and a white color light.

47. An endoscope signal processing apparatus according to claim 39 wherein said signal processing means has a first memory means for storing a video signal.

48. An endoscope signal processing apparatus according to claim 47 wherein said commonly used circuit is a second memory means for inputting a video signal from said first memory means and for storing said video signal.

49. An endoscope signal processing apparatus according to claim 48 further comprising a first output means which can output a video signal from said first storage means and a second output means which can output a video signal from said second memory means.

50. An endoscope signal processing apparatus according to claim 49 wherein said first memory means is a plurality of frame memories respectively storing signals imaged in response to respective field sequential illuminating light.

51. An endoscope signal processing apparatus according to claim 50 further comprising a mixing means wherein a video signal from said first output means and a video signal from said second output means are mixed and the video signal from the first output means and the video signal from the second output means can be displayed on one monitor.

52. An endoscope signal processing apparatus according to claim 50 further comprising a picture quality adjusting means provided between said first memory means and the first output means and second memory means.

53. An endoscope signal processing apparatus according to claim 48 further comprising a picture quality adjusting means provided between said first memory means and said second memory means.

54. An endoscope signal processing apparatus according to claim 48 further comprising a line interpolating means provided in a rear part of said second memory means.

* * * * *